US012734683B2

(12) United States Patent
Mizutani et al.

(10) Patent No.: US 12,734,683 B2
(45) Date of Patent: Sep. 15, 2026

(54) GRIPPING CONTROL DEVICE AND GRIPPING CONTROL METHOD

(71) Applicant: Sony Group Corporation, Tokyo (JP)

(72) Inventors: Satoko Mizutani, Tokyo (JP); Yasuhiro Matsuda, Tokyo (JP)

(73) Assignee: Sony Group Corporation, Tokyo (JP)

( * ) Notice: Subject to any disclaimer, the term of this patent is extended or adjusted under 35 U.S.C. 154(b) by 94 days.

(21) Appl. No.: 18/697,732

(22) PCT Filed: Aug. 22, 2022

(86) PCT No.: PCT/JP2022/031538
§ 371 (c)(1),
(2) Date: Apr. 2, 2024

(87) PCT Pub. No.: WO2023/062941
PCT Pub. Date: Apr. 20, 2023

(65) Prior Publication Data

US 2025/0236014 A1 Jul. 24, 2025

(30) Foreign Application Priority Data

Oct. 15, 2021 (JP) ................................ 2021-169412

(51) Int. Cl.
*B25J 9/16* (2006.01)
*B25J 13/08* (2006.01)
(Continued)

(52) U.S. Cl.
CPC ........... *B25J 9/1612* (2013.01); *B25J 13/082* (2013.01); *B25J 13/084* (2013.01); *B25J 15/0033* (2013.01)

(58) Field of Classification Search
CPC ...... B25J 9/1612; B25J 13/082; B25J 13/084; B25J 15/0033; B25J 13/08; B25J 15/08;
(Continued)

(56) References Cited

U.S. PATENT DOCUMENTS 10,038,854 B1 * 7/2018 Cooper ................... H10F 39/12
2008/0106258 A1 * 5/2008 Torres-Jara ............ G01L 5/226 324/207.2
(Continued)

FOREIGN PATENT DOCUMENTS

JP H01-316194 A 12/1989
JP 2000-254884 A 9/2000
(Continued)

OTHER PUBLICATIONS

International Search Report and Written Opinion mailed on Nov. 1, 2022, received for International Application No. PCT/JP2022/031538, filed on Aug. 22, 2022, 8 pages including English Translation.
(Continued)

*Primary Examiner* — Adam R Mott
*Assistant Examiner* — Byron Xavier Kasper
(74) *Attorney, Agent, or Firm* — XSENSUS LLP

(57) ABSTRACT

A gripping control device according to the present disclosure includes: a detector that detects displacement in a normal direction of each of a plurality of elastic bodies each having a curved surface shape, the plurality of elastic bodies provided for each of a plurality of fingertips that is in contact with a gripped object; and a calculation section that calculates a contact surface normal of each of the fingertips to the gripped object on the basis of a result of detection by the detector.

21 Claims, 28 Drawing Sheets

(51) Int. Cl.
*B25J 15/00* (2006.01)
*B25J 19/02* (2006.01)

(58) Field of Classification Search
CPC ....... B25J 19/02; B25J 9/00; B25J 9/16; B25J 9/1602; B25J 9/161; B25J 9/1633; B25J 9/1653; B25J 9/1661; B25J 9/1669; B25J 13/085
See application file for complete search history.

(56) References Cited

U.S. PATENT DOCUMENTS

2019/0001508 A1* 1/2019 Li .......................... B25J 9/1612
2020/0246980 A1* 8/2020 Kuppuswamy ...... B25J 15/0033
2021/0122039 A1* 4/2021 Su .......................... B25J 9/1633
2021/0252721 A1* 8/2021 Alspach ............... B25J 15/0033
2021/0394360 A1* 12/2021 Hwang .................. B25J 9/1612
2023/0125022 A1* 4/2023 Li ............................ B25J 9/023
700/245
2023/0349782 A1* 11/2023 Nabeto ................... G01L 1/142

FOREIGN PATENT DOCUMENTS

JP 2009-056593 A 3/2009
JP 2009-075929 A 4/2009
JP 2017-177294 A 10/2017
WO 2020/246263 A1 12/2020
WO 2022/039058 A1 2/2022

OTHER PUBLICATIONS

Liu et al., "Intelligent Fingertip Sensing for Contact Information Identification", Advances in Reconfigurable Mechanisms and Robots, Jan. 2012, 9 pages.

* cited by examiner 52
100
f
GRIP FORCE
EXCESSIVE
APPROPRIATE
INSUFFICIENT
GRIP FORCE f
OBJECT DESTRUCTION
APPROPRIATE
OCCURRENCE OF INITIAL SLIP
SLIP 52
100
$F_x$
$F_x$
(A)
52
100
(B)
(C)
STICK RATIO
100%
60%
24%
0%
CONTACT SURFACE
$F_x$

SITUATION 1

SITUATION 2

COLUMN

FIG. 25

| | PLANE | COLUMN (DIRECTION WITH NO CURVATURE) | COLUMN (DIRECTION WITH CURVATURE) | SPHERE |
|---|---|---|---|---|
| DETERMINATION COEFFICIENT ($R^2$) | 0.92 | 0.90 | — | — |
| STANDARD DEVIATION | 0.19 | 0.08 | 0.18 | 0.12 |

FIG. 26

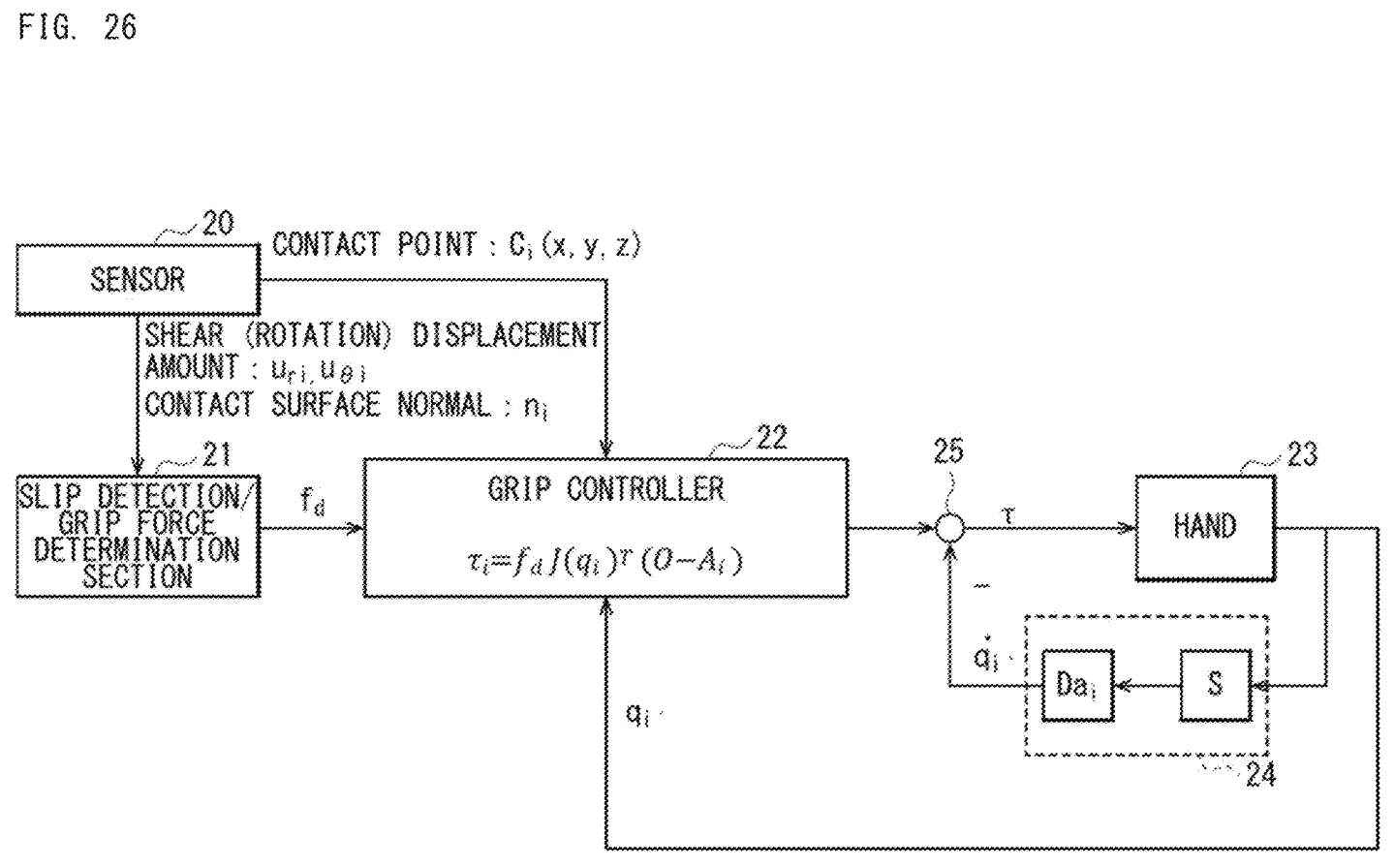

SENSOR 20

CONTACT POINT : $C_i(x, y, z)$

SHEAR (ROTATION) DISPLACEMENT AMOUNT : $u_{ri}, u_{\theta i}$

CONTACT SURFACE NORMAL : $n_i$

SLIP DETECTION/ GRIP FORCE DETERMINATION SECTION 21

$f_d$

GRIP CONTROLLER 22

$\tau_i = f_d J(q_i)^T (O - A_i)$ $q_i$

25

$\tau$

HAND 23

S $Da_i$

24

$\dot{q}_i$

FIG. 32

| PHYSICAL PARAMETERS OF ROBOT HAND | | |
|---|---|---|
| $l_{11}=l_{12}=l_{21}=l_{22}$ | LENGTH OF EACH FINGER | 0.060 [m] |
| $D_{11}=D_{12}=D_{21}=D_{22}$ | DENSITY OF EACH FINGER | 1000 [kg/m^3] |
| $Ba$ | BASE LENGTH | 0.1 [m] |
| $r_1=r_2$ | FINGERTIP RADIUS | 0.010 [m] |
| $q_{11}=q_{12}=q_{21}=q_{22}$ | INITIAL JOINT ANGLE | 45 [deg] |

FIG. 33

| PHYSICAL PARAMETERS OF GRIPPED OBJECT AND CONTROL SIGNAL | | | |
|---|---|---|---|
| GRIPPED OBJECT | $l_1$ | LENGTH | 0.060 [m] |
| | $l_2$ | | 0.080 [m] |
| | $l_3$ | | 0.100 [m] |
| | $D$ | DENSITY | 1000 [kg/m^3] |
| | $\theta_1$ | INCLINATION ANGLE | 5deg |
| | $\theta_2$ | | 10deg |
| | $\theta_3$ | | 15deg |
| CONTROL SIGNAL | $f_d$ | TARGET GRIP FORCE | 2 [N] |
| | $Da_1$ | DAMPING COEFFICIENT | 0.006 [msN] |

GRIPPING CONTROL DEVICE AND GRIPPING CONTROL METHOD

CROSS-REFERENCE TO RELATED APPLICATIONS

The present application is a national stage application, pursuant to 35 U.S.C. § 371, of International Application No. PCT/JP2022/031538, filed Aug. 22, 2022, which claims priority to Japanese Patent Application No. 2021-169412, filed Oct. 15, 2021, the entire contents of each are incorporated herein by reference.

TECHNICAL FIELD

The present disclosure relates to a gripping control device and a gripping control method.

BACKGROUND ART

There have been proposed various technologies related to control of a robot hand or the like (for example, see PTLs 1 and 2 and NPTL 1). Even if a gripped object is an unknown object (an object whose mass, gravity center position, coefficient of friction, or the like is unknown), the robot hand or the like is desired to stably grip the unknown object. In order to achieve stable gripping, it is desired to appropriately give the magnitude and direction of each fingertip force in the robot hand or the like.

CITATION LIST

Patent Literature

PTL 1: Japanese Unexamined Patent Application Publication No. 2009-56593 PTL 2: Japanese Unexamined Patent Application Publication No. 2007-75929

Non-Patent Literature

NPTL 1: "Intelligent Fingertip Sensing for Contact Information Identification", Advances in Reconfigurable Mechanisms and Robots, pp. 599-608, 2012

SUMMARY OF THE INVENTION

In order to achieve stable gripping of an unknown object, it is conceivable that a contact surface normal of each fingertip to the gripped object, or the like is calculated and used for control of a fingertip force.

It is desirable to provide a gripping control device and a gripping control method that make it possible to achieve stable gripping of an unknown object.

A gripping control device according to an embodiment of the present disclosure includes: a detector that detects displacement in a normal direction of each of a plurality of elastic bodies each having a curved surface shape, the plurality of elastic bodies provided for each of a plurality of fingertips that is in contact with a gripped object; and a calculation section that calculates a contact surface normal of each of the fingertips to the gripped object on the basis of a result of detection by the detector.

A gripping control method includes: detecting displacement in a normal direction of each of a plurality of elastic bodies each having a curved surface shape, the plurality of elastic bodies provided for each of a plurality of fingertips that is in contact with a gripped object; and calculating a contact surface normal of each of the fingertips to the gripped object on the basis of a result of the detection.

According to the gripping control device or the gripping control method according to the embodiment of the present disclosure, the contact surface normal of each of the fingertips to the gripped object is calculated on the basis of the displacement in the normal direction of each of the plurality of elastic bodies each having a curved surface shape. The plurality of elastic bodies is provided for each of the plurality of fingertips that is in contact with the gripped object.

BRIEF DESCRIPTION OF DRAWINGS

FIG. 25 is an explanatory diagram illustrating an evaluation result of each evaluation object.

FIG. 26 is a block diagram schematically illustrating an example of hand control by a gripping control device according to the first embodiment.

FIG. 32 is an explanatory diagram illustrating physical parameters of the robot hand used for simulation of evaluation of the hand control method by the gripping control device according to the first embodiment.

FIG. 33 is an explanatory diagram illustrating physical parameters of the gripped object and control parameters of hand control used for the simulation of evaluation of the hand control method by the gripping control device according to the first embodiment.

MODES FOR CARRYING OUT THE INVENTION

Some embodiments of the present disclosure are described below in detail with reference to the drawings. It is to be noted that description is given in the following order.

0. Comparative Examples (FIGS. 1 to 4)
1. First Embodiment (FIGS. 5 to 33)
1.1 Configuration Example of Gripping System
1.2 Configuration Example, Operation Example, and Evaluation Example of Respective Components of Gripping System
1.3 Effects
2. Other Embodiments

0. Comparative Examples

Even if a gripped object is an unknown object (an object whose mass, gravity center position, coefficient of friction, or the like is unknown), a robot hand or the like is desired to stably grip the unknown object. In order to achieve stable gripping, it is desired to appropriately give the magnitude and direction of each fingertip force in the robot hand or the like. There are two conditions for stable gripping: each fingertip force is present in a friction cone (occurrence of a slip is prevented) (Condition 1), and a resultant force and a resultant moment are 0 (Condition 2). In order to satisfy Condition 1, detection of an initial slip is effective. The initial slip is a precursory phenomenon of a slip, and is a phenomenon in which only a part of a contact surface of a fingertip slides. The initial slip occurs gradually as a pressure distribution becomes steeper, which makes it easier to detect the initial slip. In order to make the pressure distribution steep, the fingertip is desired to be a curved elastic body. In order to satisfy Condition 2, a method using a contact point and a contact surface normal of the fingertip during a gripping operation is generally used. Consequently, in order to satisfy both Condition 1 and Condition 2, it is desired to detect a contact surface normal and a contact point of a fingertip that is a curved elastic body during a gripping operation.

Here, description is given of technical issues of detection of the contact surface normal and the contact point of the fingertip that is the curved elastic body during the gripping operation with reference to on FEM (Finite Element Method) analysis results.

Figure 1:
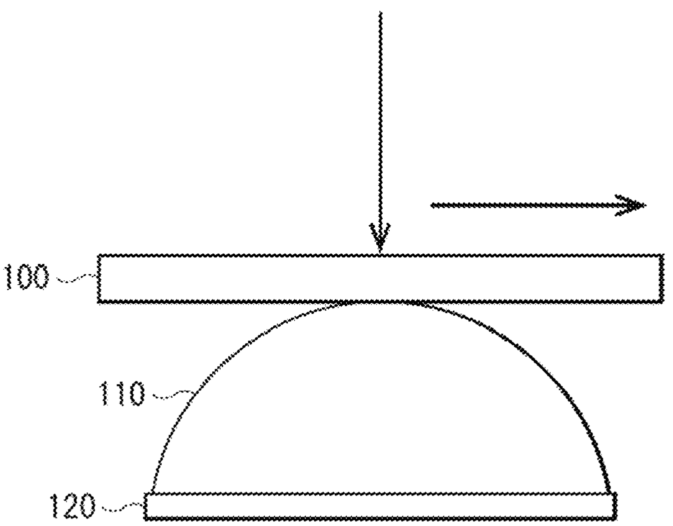
FIG. 1 is a configuration diagram schematically illustrating a state in which an object is brought into vertical contact with a fingertip of a curved elastic body and thereafter, shear displacement is caused.
Figure 2:
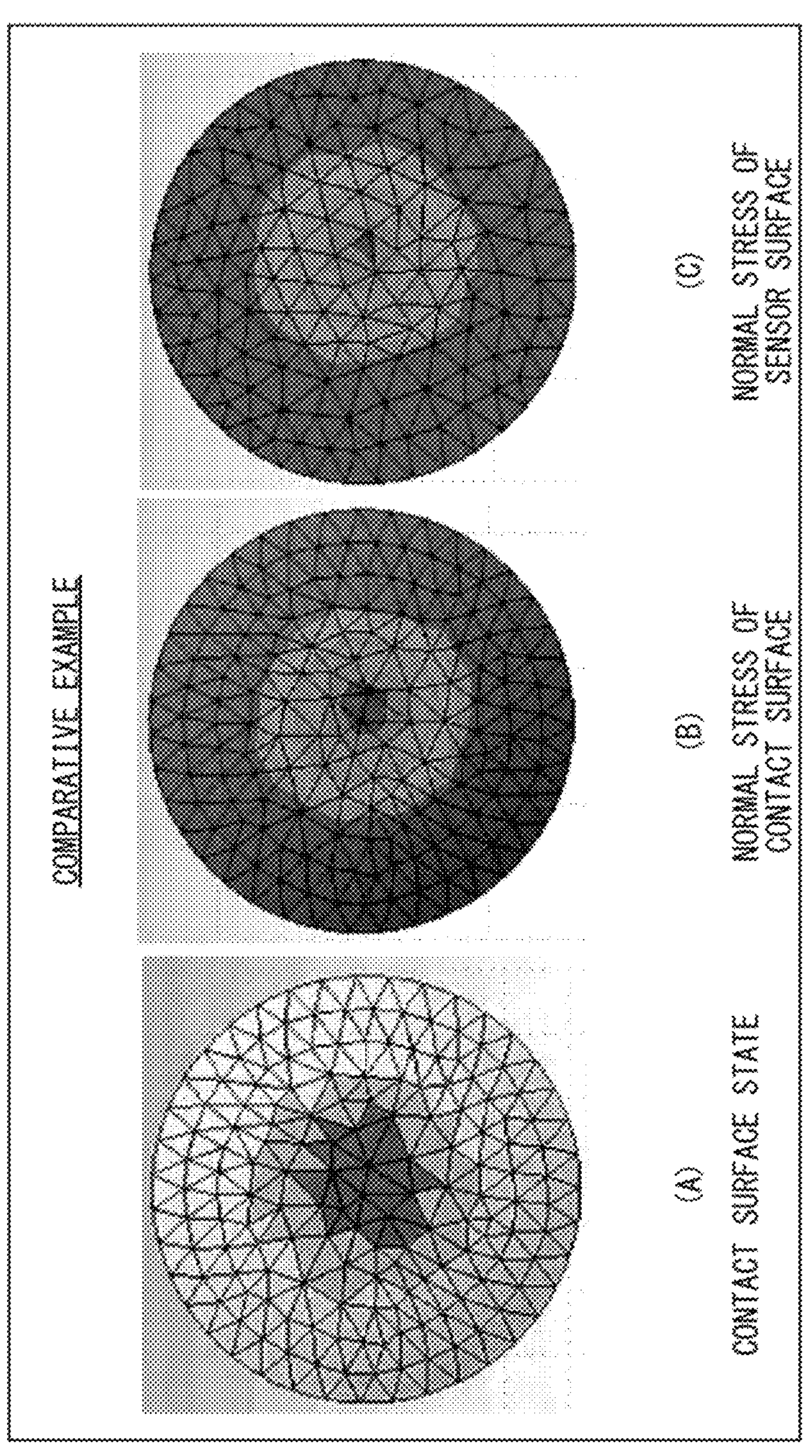
FIG. 2 is an explanatory diagram illustrating FEM analysis results in the state illustrated in FIG. 1.
Figure 3:
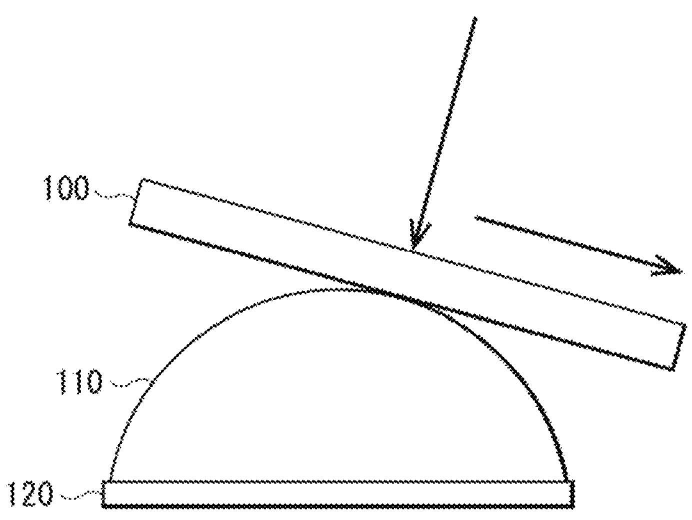
FIG. 3 is a configuration diagram schematically illustrating a state in which the object is brought into oblique contact with the fingertip of the curved elastic body.
Figure 4:
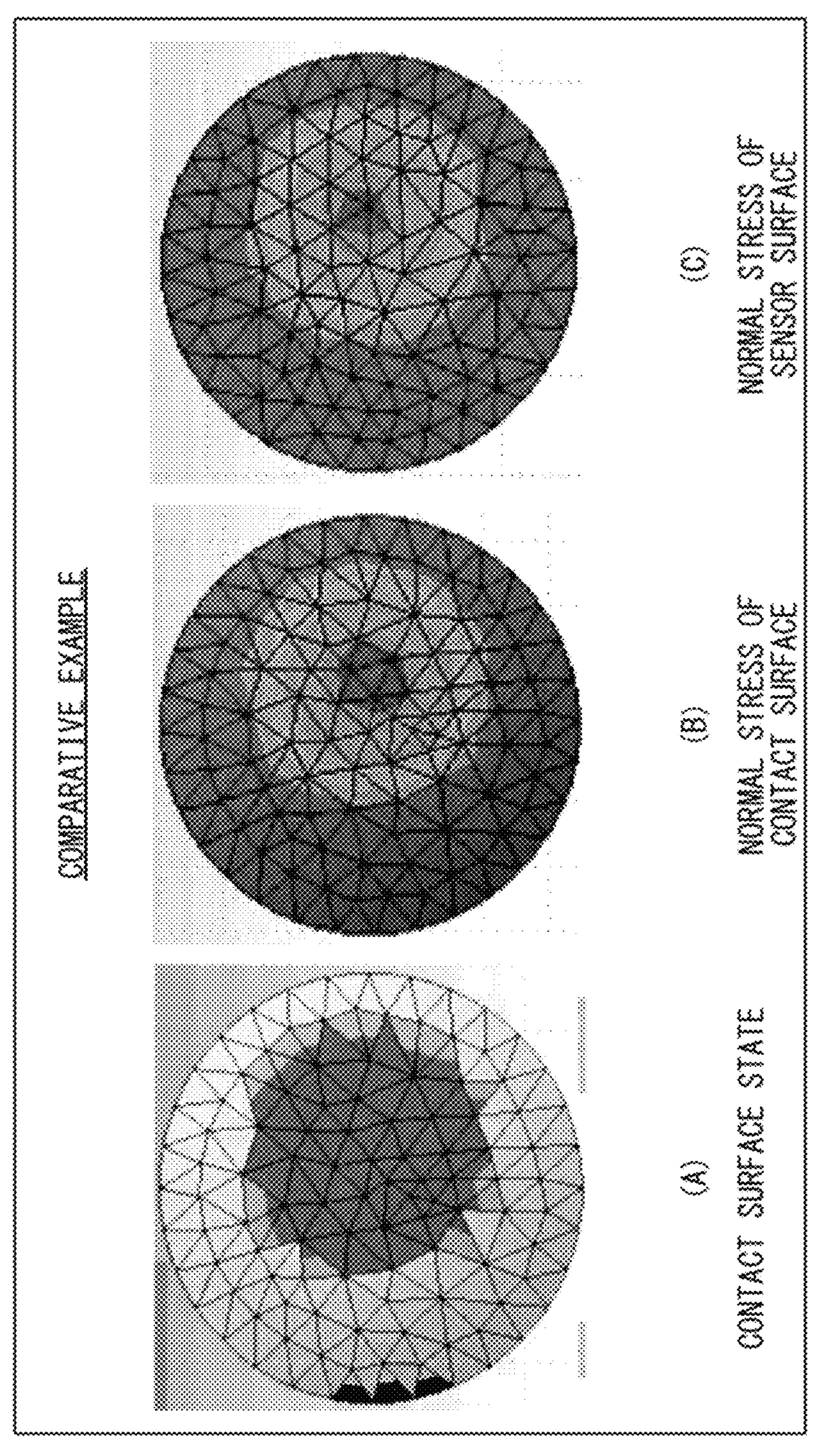
FIG. 4 is an explanatory diagram illustrating FEM analysis results in the state illustrated in FIG. 2.

FIG. 1 schematically illustrates a state in which an object 100 is brought into vertical contact with a fingertip 110 that is a curved elastic body, and thereafter, shear displacement is caused. FIG. 2 illustrates FEM analysis results in the state illustrated in FIG. 1. FIG. 3 schematically illustrates a state in which the object 100 is brought into oblique contact with the fingertip 110 that is the curved elastic body. FIG. 4 illustrates FEM analysis results in the state illustrated in FIG. 3. A sensor 120 is provided on a bottom surface of the fingertip 110.

FIG. 2 and FIG. 4 illustrate, as the FEM analysis results, a contact surface condition (A), a normal stress distribution of a contact surface (B), and a normal stress distribution of a sensor surface (C). It can be seen from the results in FIGS. 2 and 4 that the normal stress distribution changes to a distribution that takes a maximum at a position deviated from a center in either a case where the object 100 is brought into vertical contact with the fingertip 110 or a case where the object 100 is brought into oblique contact with the fingertip 110. It can be seen from this that it is difficult to distinguish between a case where the object 100 is brought into vertical contact with the fingertip 110 and thereafter, shear displacement is caused and a case where the object 100 is brought into oblique contact with the fingertip 110.

In existing technologies, there is no example in which an attempt is made to combine detection of the initial slip necessary in Condition 1 described above and detection of the contact surface normal and the contact point necessary in Condition 2 described above. Accordingly, in the existing technologies, it is difficult to detect the contact surface normal and the contact point of the fingertip that is the curved elastic body during the gripping operation. Existing technologies and issues thereof are described below.

NPTL 1 ("Intelligent Fingertip Sensing for Contact Information Identification", Advances in Reconfigurable Mechanisms and Robots, pp. 599-608, 2012) is an existing technology related to detection of the contact surface normal and the contact point. In the technology described in NPTL 1, a contact surface normal and a contact point of a curved rigid body fingertip are calculated from a mathematical model with use of six-axis force sense information. In the technology described in NPTL 1, it is assumed that the fingertip is a rigid body and does not deform. Accordingly, it is difficult to combine calculation of the contact surface normal and the contact point of the fingertip that is the curved elastic body, and initial slip detection.

PTL 1 (Japanese Unexamined Patent Application Publication No. 2009-56593) is an existing technology related to detection of the contact surface normal and contact point. In the technology described in PTL 1, a fingertip surface is element-divided, and a contact point and a contact surface normal are calculated in advance from coordinates of each lattice point. By image recognition, coordinates of a target contact point on an object are determined, a fingertip contact point having a normal in a direction along a normal vector thereof is obtained, and a target joint angle is obtained. The technology described in PTL 1 is not a technology for stable gripping after contact, but a technology for a fingertip approach before contact, and does not consider detection after contact. In addition, in a method by image recognition, occlusion may occur depending on positions and orientations of a robot hand and an object.

PTL 2 (Japanese Unexamined Patent Application Publication No. 2007-75929) is an existing technology related to multi-finger hand control using a contact surface normal and a contact point. The technology described in PTL 2 proposes that fluctuation of a contact point between a finger and an object to be gripped is added to a control system. In addition, the magnitude of a fingertip force is determined by using a known coefficient of friction. A six-axis force sensor is used to detect the contact surface normal and the contact point. The technology described in PTL 2 is based on assumption that the coefficient of friction is known, and does not consider combination with initial slip detection. A sensor to be used is a six-axis force sensor, and seems to be based on assumption of being a rigid body, and combination with initial slip detection is difficult.

1. First Embodiment

1.1 Configuration Example of Gripping System

Figure 5:
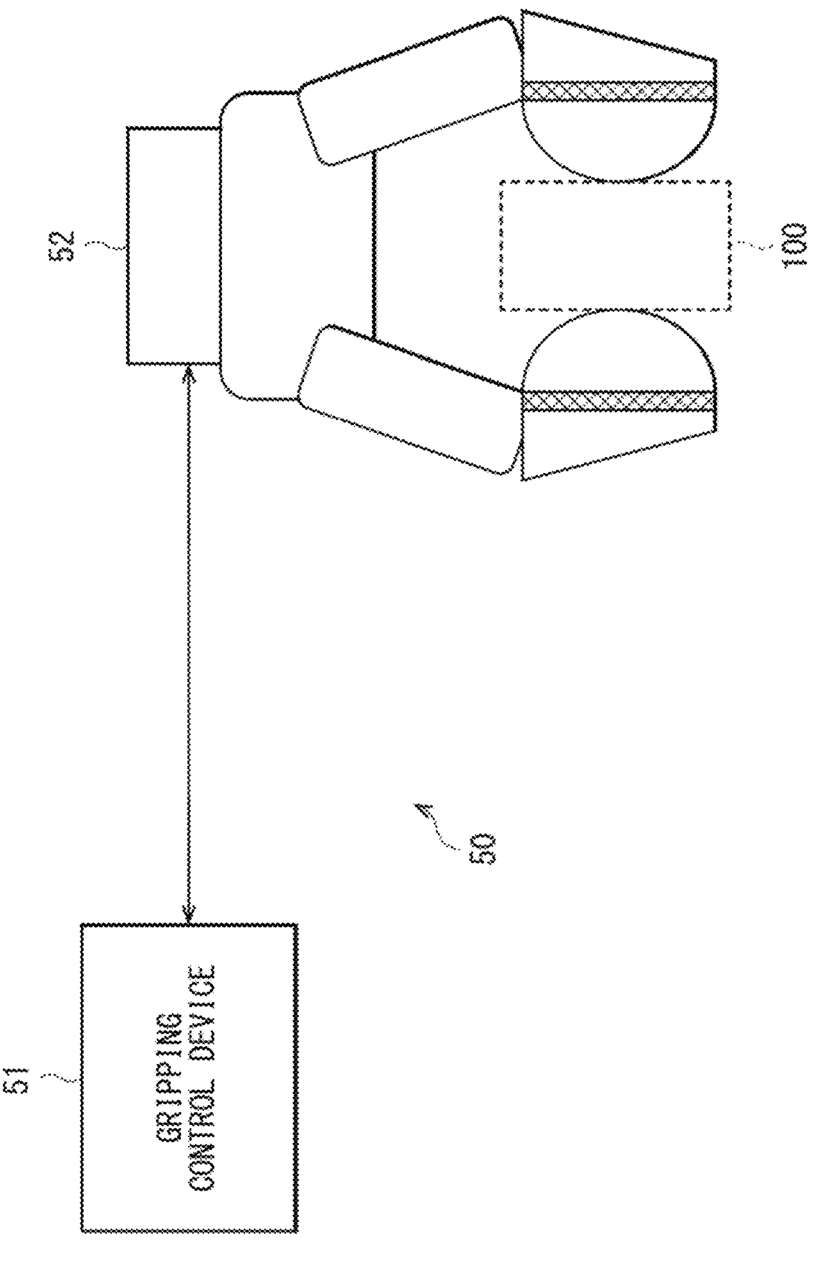
FIG. 5 is a configuration diagram schematically illustrating an example of a gripping system according to a first embodiment of the present disclosure.

FIG. 5 schematically illustrates a configuration example of a gripping system according to a first embodiment of the present disclosure.

A gripping system 50 is a system that grips the object 100, and includes a gripping control device 51 and a gripping device 52 as illustrated in FIG. 5. The gripping control device 51 is communicably coupled to the gripping device 52, and is configured to control driving of the gripping device 52. For example, the gripping control device 51 is configured to drive the gripping device 52 so as to grip the object 100, and is configured to control a grip force (a fingertip force) with which the gripping device 52 grips the object 100. In addition, the gripping control device 51 is configured to obtain information obtained in the gripping device 52. For example, the gripping control device 51 is configured to control driving of the gripping device 52 with use of the information obtained from the gripping device 52.

The gripping control device 51 includes a "detector" and a "calculation section" in the technology of the present disclosure. The detector in the gripping control device 51 detects displacement in a normal direction of each of a plurality of elastic bodies 10 (FIG. 8 to be described later), or the like, as described later. The plurality of elastic bodies 10 each has a curved surface shape, and is provided for each of a plurality of fingertips 1 of the gripping control device 51. The calculation section in the gripping control device 51 calculates a contact surface normal of each fingertip 1 to a gripped object, or the like on the basis of a result of detection by the detector, as described later.

The gripping control device 51 may include, for example, a computer including one or more CPUs (Central Processing Units), one or more ROMs (Read Only Memories), and one or more RAMs (Random Access Memories). In this case, the one or more CPUs executes processing based on a program stored in the one or more ROMs or RAMs to thereby enable processing on each component by the gripping control device 51. In addition, the one or more CPUs may execute processing based on a program supplied from outside through, for example, a wired or wireless network to thereby enable the processing on each component by the gripping control device 51.

The gripping device 52 is, for example, a robot hand, and performs processing related to gripping of the object 100. For example, the gripping device 52 is driven in accordance with control by the gripping control device 51 to enable gripping of the object 100 with a grip force specified by the gripping control device 51.

(Initial Slip)

For a task, such as object gripping or walking, of a robot, it is necessary to control a contact force with a surrounding environment or the object 100 for gripping or walking. However, in a case where a physical quantity of the environment or the object 100 is unknown, such control becomes difficult. For example, for grip control, it is necessary to control a grip force that does not cause the object 100 to slide and be destroyed, but in a case of an unknown object whose physical quantity (mass, gravity center position, coefficient of friction, or the like) is unknown, it is difficult to determine an appropriate grip force, which is an issue of robot control.

What is attracting attention is a phenomenon called an "initial slip". The initial slip is a phenomenon in which only a part of a contact surface slides, and is also called a precursory phenomenon of an total slip. In a case where an initial slip region gradually expands and spreads over an entire contact region, transition to a commonly referred to "slip" (also referred to as a total slip) occurs, resulting in relative motion with the object 100 or the environment in contact.

Here, a "stick" refers to a state in which static friction occurs over an entire contact surface between a fingertip and the object 100 as a gripped object and no relative motion occurs between the fingertip and the object 100. In addition, the "slip (total slip)" refers to a state in which dynamic friction occurs and involves relative motion between two contacting objects. Here, the "slip" refers to a slip in which dynamic friction occurs over the entire contact surface between the fingertip and the gripped object and involves relative motion therebetween.

The "initial slip" is a phenomenon in which dynamic friction occurs at a part of the contact surface between the fingertip and the gripped object, which is also referred to as a precursory phenomenon of occurrence of the slip (total slip) described above. It is said that during transition from a "stick" state to a "slip" state, this initial slip state exists. In a case of the initial slip state, no relative motion occurs between the fingertip and the gripped object.

Figure 6:
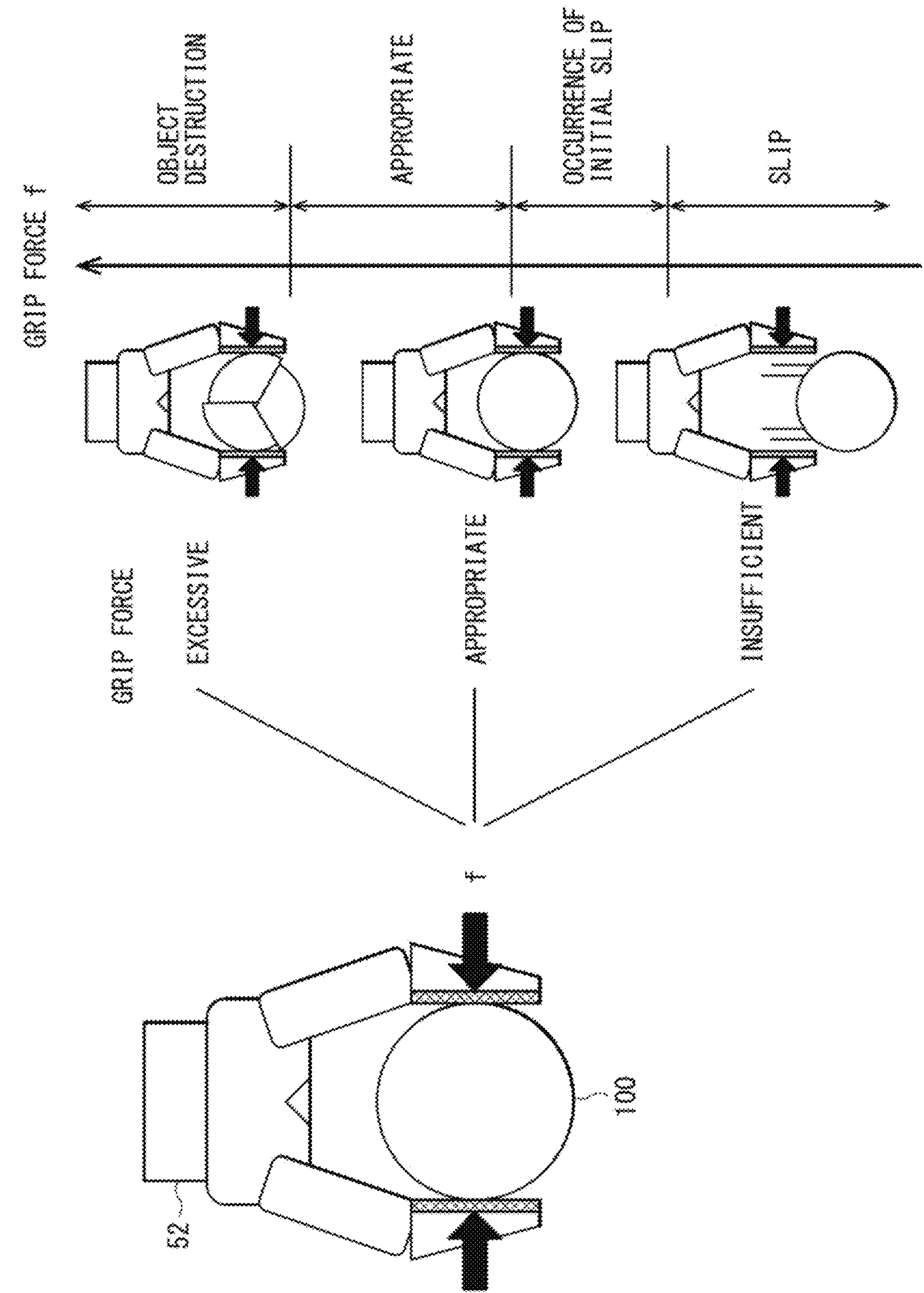
FIG. 6 is an explanatory diagram about grip force control.

For example, as illustrated in FIG. 6, in a case where a grip force f, which is a force acting in a normal direction perpendicular to the contact surface, is excessively large, the object 100 is destroyed. In addition, in a case where the grip force f falls below an appropriate level, the "initial slip" occurs, and in a case where the grip force f is insufficient, the "initial slip" develops into the "slip", which prevents the object 100 from being gripped (which causes the object 100 to be dropped).

In other words, if this initial slip is detectable, it is possible to calculate a minimum grip force for holding an object without slipping in, for example, grip control. If it is possible to grip an object with the minimum grip force, it is possible to further reduce a possibility of destroying the object by gripping.

(Stick Ratio)

In order to control the initial slip, it is necessary to quantify the degree of the initial slip. Here, a contact region is divided into a "stick region" in which no initial slip occurs (that is, a partial region in which static friction occurs of the contact surface between the fingertip and the gripped object) and a "slip region" in which the initial slip occurs (that is, a partial region in which dynamic friction occurs of the contact surface between the fingertip and the gripped object). It is possible to represent a slip degree as a ratio between the two regions. Here, a ratio of the stick region to the contact region is defined as a "stick ratio". In a case of a sticking ratio of 1 (=100%), the contact region is in a completely sticking state with no slip region. In contrast, in a case of a stick ratio of 0, the contact region is in a state in which the entire contact region is the slip region and a slip (a total slip) occurs. In contrast, in a case of a stick ratio of 0, the contact region is in a state in which the entire contact region is the slip region and a slip (a total slip) occurs.

Figure 7:
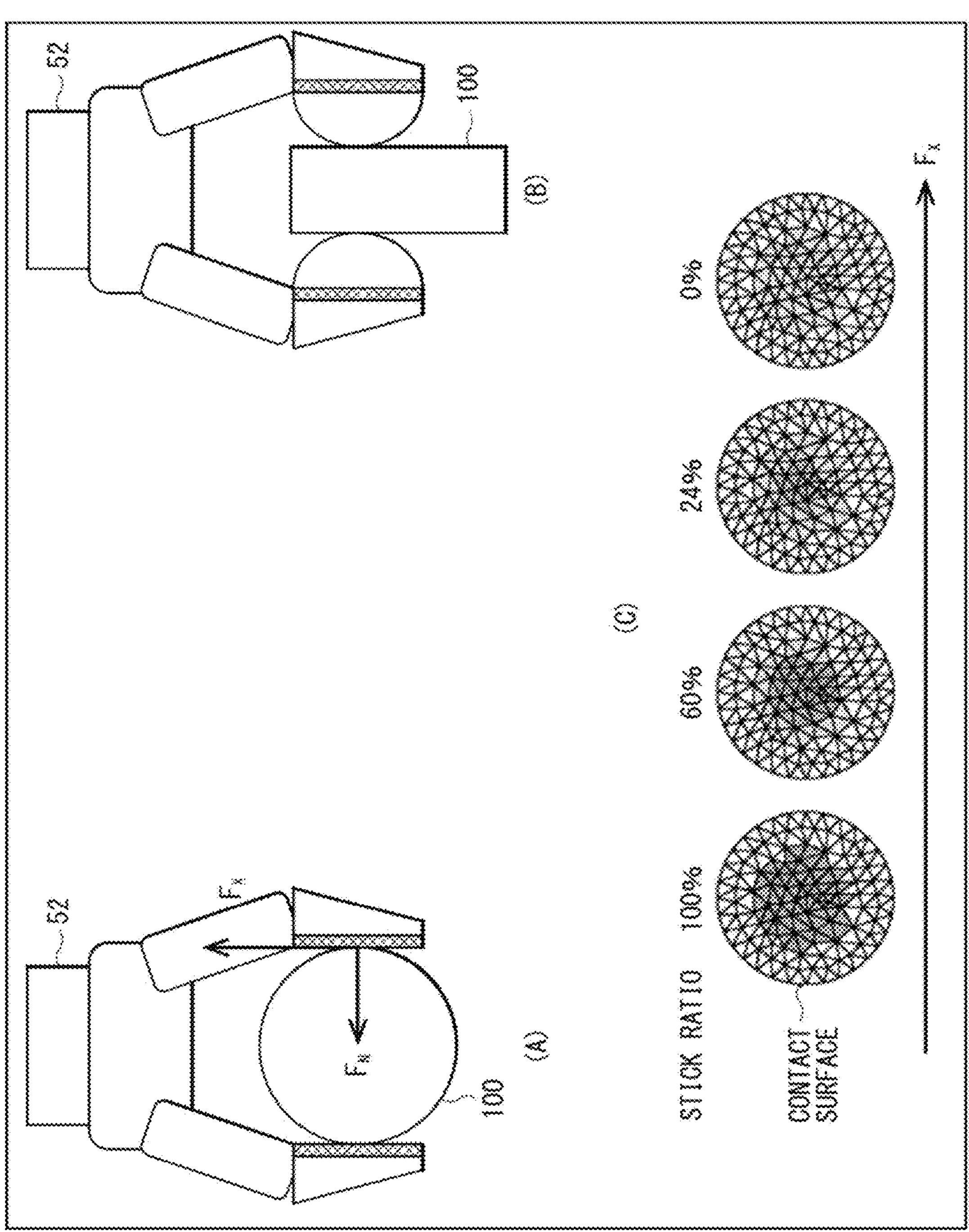
FIG. 7 is an explanatory diagram about a stick ratio.

For example, (C) of FIG. 7 illustrates an example of a result obtained by performing FEM analysis under a condition corresponding to a case where a spherical object as the object 100 is gripped with planar fingertips as illustrated in (A) of FIG. 7, or a case where a planar object as the object 100 is gripped by curved fingertips as illustrated in (B) of FIG. 7. (C) of FIG. 7 illustrates a state of change in stick ratio (slip region/stick region) at the contact surface. A region indicated by dark gray represents a stick region, and a region indicated by light gray represents a slip region. As a shear force $F_X$ (unit: Newtons (N)) that is a force acting in a shear direction increases, the slip region spreads from a periphery of the contact surface, and when the stick ratio becomes 0%, the entire region is changed to the slip region. Accordingly, it can be said that in order to grip the object 100 without slipping, it is sufficient if the grip force is adjusted to such an extent that the stick ratio does not become 0%.

Here, the "shear direction" is a direction orthogonal to a contact surface normal direction, and indicates a direction parallel to the contact surface. The shear direction is the same as a direction in which a slip occurs.

1.2 Configuration Example, Operation Example, and Evaluation Example of Respective Components of Gripping System

Figure 8:
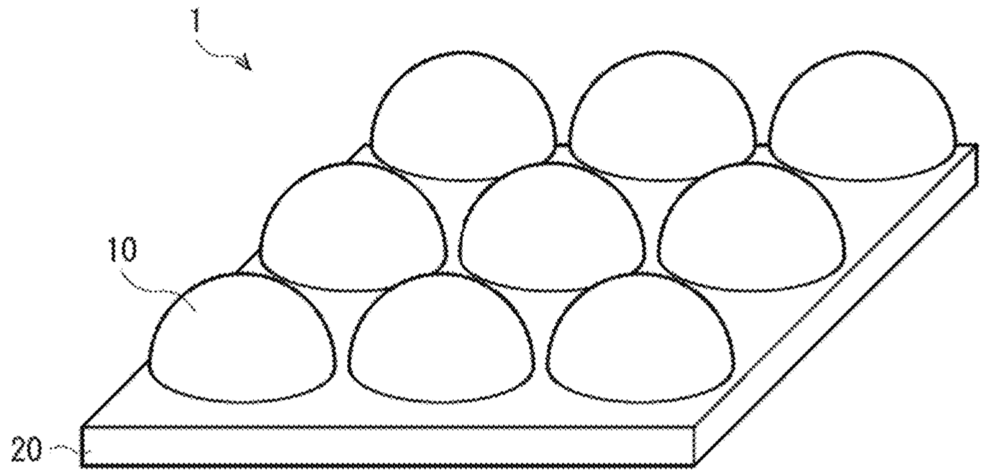
FIG. 8 is a configuration diagram schematically illustrating an example of a fingertip in a gripping device according to the first embodiment.

Example of Method of Calculating Contact Surface Normal and Contact Point Combined with Initial Slip Detection The gripping device 52 such as a robot hand includes a plurality of fingertips 1. FIG. 8 illustrates a configuration example of one fingertip 1. Each of the fingertips 1 includes a plurality of elastic bodies 10 each having a curvature (having a curved surface shape), and a sensor 20 such as a pressure distribution sensor provided on a bottom surface of each of the elastic bodies 10. A detector of the gripping control device 51 is configured to simultaneously detect displacement in the normal direction of each of the elastic bodies 10, displacement in the shear direction of each of the fingertips 1, and an initial slip of each of the fingertips 1 that occurs while gripping the gripped object on the basis of a result of detection by the sensor 20 of each of the fingertips 1. It is to be noted that description below is given as an example of a case where a pressure distribution sensor is used as the sensor 20 to detect a force in the normal direction acting on each of the elastic bodies 10, displacement in the normal direction of each of the elastic bodies 10, and displacement in the shear direction of each fingertip. However, the sensor 20 is not limited to the pressure distribution sensor, and a force sensor, an optical tactile sensor, a displacement sensor, or the like may be used as the sensor 20. In a case where the force sensor is used, the detector of the gripping control device 51 is configured to directly detect the force in the normal direction by the force sensor. In addition, in the case where the force sensor is used, the detector of the gripping control device 51 is configured to directly detect a force in the shear direction by the force sensor and convert the force into displacement in the shear direction by the force sensor. In a case where the optical tactile sensor is used, the detector of the gripping control device 51 is configured to detect the force in the normal direction as with a case where the pressure distribution sensor is used. In addition, in the case where the optical tactile sensor is used, the detector of the gripping control device 51 is configured to directly detect displacement in the shear direction by the optical tactile sensor. In a case where the displacement sensor is used, the detector of the gripping control device 51 is configured to directly detect displacement in the normal direction by the displacement sensor.

Figure 9:
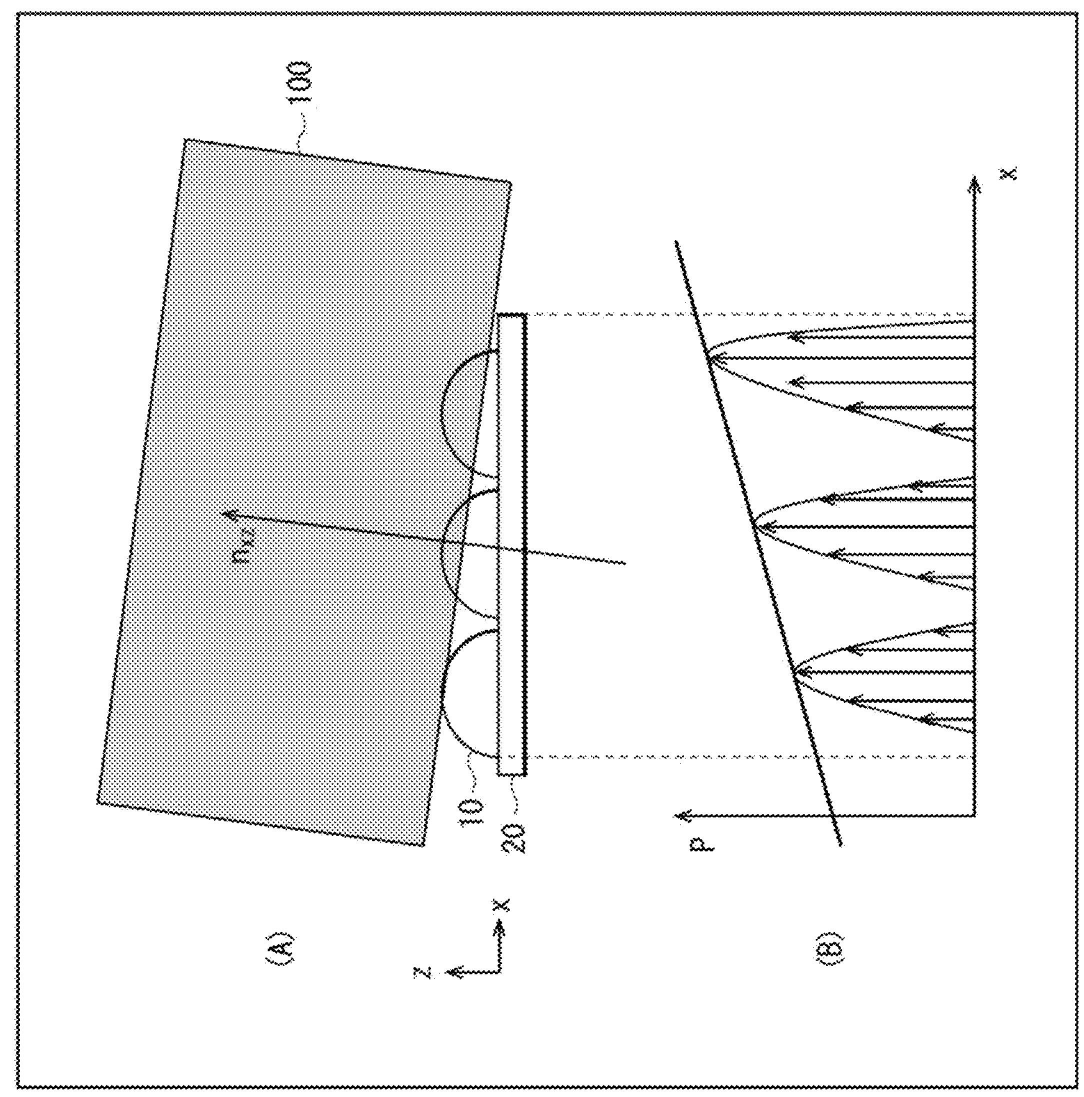
FIG. 9 is an explanatory diagram illustrating an outline of a method of calculating a contact surface normal.
Figure 10:
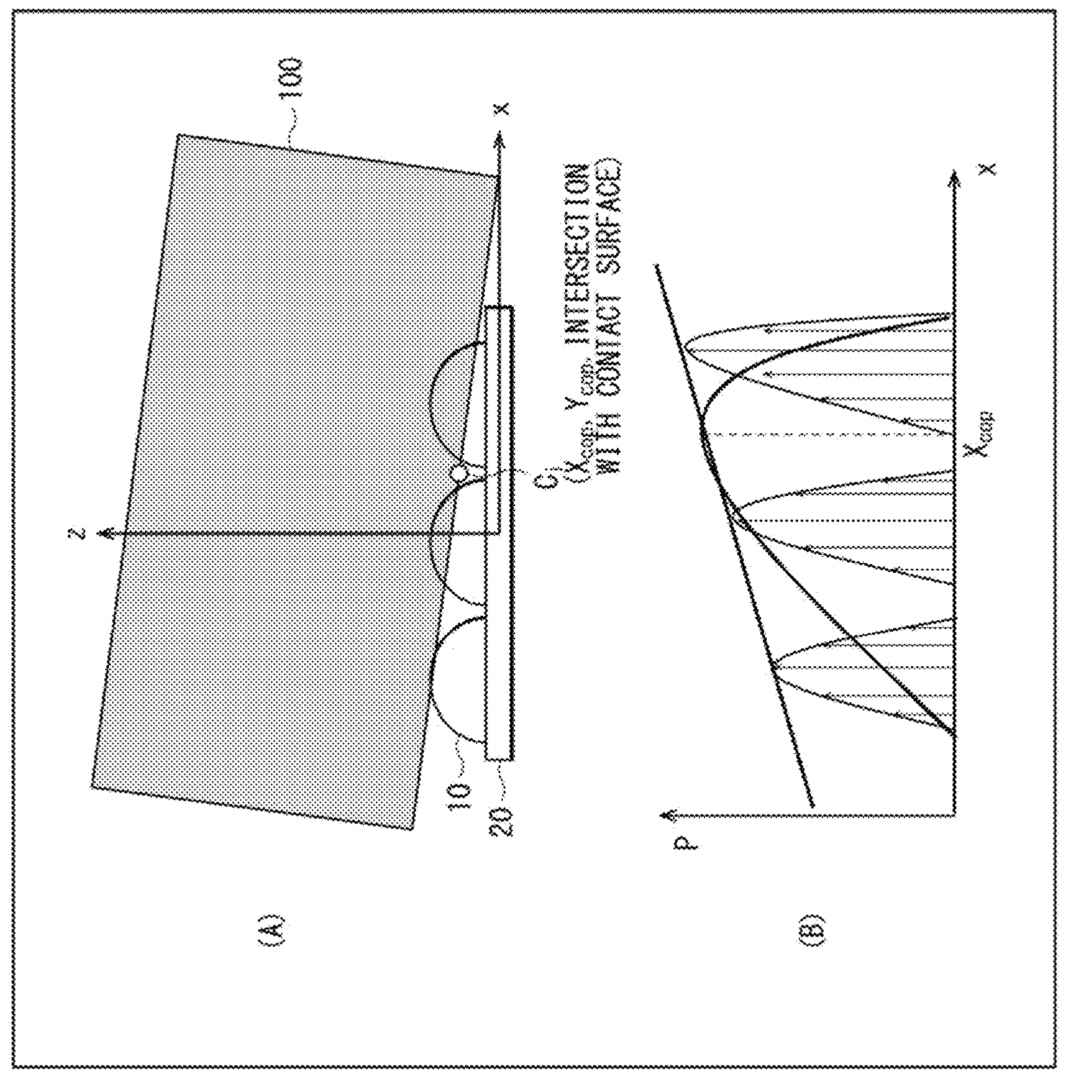
FIG. 10 is an explanatory diagram illustrating an outline of a method of calculating a contact point.

FIG. 9 illustrates an outline of a method of calculating the contact surface normal. FIG. 10 illustrates an outline of a method of calculating the contact point. The detector of the gripping control device 51 calculates displacement (a push-in amount) δ in the normal direction of each elastic body 10 from the force in the normal direction acting on each elastic body 10 and contact surface information about each elastic body 10 with respect to the gripped object with use of, for example, Equation (1) and Equation (2) based on the following Hertzian theorem. The calculation section of the gripping control device 51 calculates the contact surface of each fingertip 1 with the gripped object by linearly approximating each push-in amount (see (A) and (B) of FIG. 9).

Here, $P_{max}$ is a maximum contact pressure,

F is a contact force,

E* is a contact elastic modulus,

R* is a relative radius of curvature, and

δ is displacement in the normal direction (push-in amount).

[Math. 1]

$$P_{max} = \frac{1}{\pi}\left(\frac{6FE^2}{R^2}\right)^{\frac{1}{3}} \quad (1)$$

[Math. 2]

$$\delta = \left(\frac{3F}{4E^*}\right)^{\frac{2}{3}}\left(\frac{1}{R^*}\right)^{\frac{1}{3}} \quad (2)$$

The calculation section of the gripping control device 51 calculates a contact surface normal vector $n_{xz}$ (see (A) of FIG. 9) from an estimated contact surface. The calculation section of the gripping control device 51 calculates a contact point $C_i$ between each fingertip 1 and the gripped object on the basis of the contact surface of each fingertip 1 with the gripped object (see (A) and (B) of FIG. 10). The calculation section of the gripping control device 51 calculates, for example, x and y coordinates of the contact point $C_i$ from a pressure center position (CoP) in the pressure distribution sensor as the sensor 20 on the basis of, for example, the following Equations (3) and (4). The calculation section of the gripping control device 51 calculates a z coordinate of the contact point $C_i$ from, for example, an intersection of the contact surface described above and the x and y coordinates (a height in a z-axis direction of an x-y coordinate point on the contact surface). Here, it is possible to detect various object shapes by using a maximal-value filter for respective x and y axes. In addition, as a countermeasure against destabilization upon change in the number of contact hemispheres, it is preferable that a numerical value be updated only in a case where contact and non-contact are continuously detected to some extent. The pressure distribution sensor includes a plurality of nodes for detecting a pressure formed in a matrix. In Equation (3) and Equation (4), N is the number of sensor nodes of the pressure distribution sensor, xi is a coordinate of an i-th node in an x-axis direction, yi is a coordinate of the i-th node in a y-axis direction, p(xi) is a pressure detected by the i-th node in the x-axis direction, and p(yi) is a pressure detected by the i-th node in the y-axis direction.

[Math. 3]

$$X_{cop} = \frac{\sum_0^{N-1}\{p(x_i)\cdot x_i\}}{\sum_0^{N-1} p(x_i)} \tag{3}$$

[Math. 4]

$$Y_{cop} = \frac{\sum_0^{N-1}\{p(y_i)\cdot y_i\}}{\sum_0^{N-1} p(y_i)} \tag{4}$$

Example of Evaluation of Method of Calculating Contact Surface Normal and Contact Point Combined with Initial Slip Detection

Figure 11:
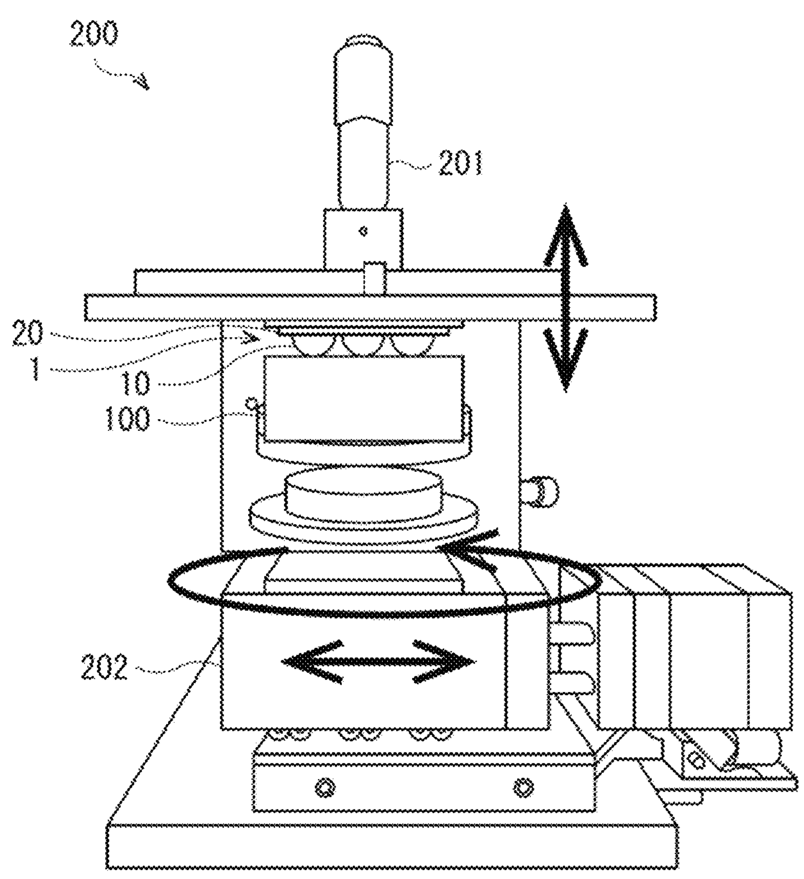
FIG. 11 is an explanatory diagram schematically illustrating a first example (Situation 1) of an evaluation environment of detection accuracy of the contact surface normal.
Figure 12:
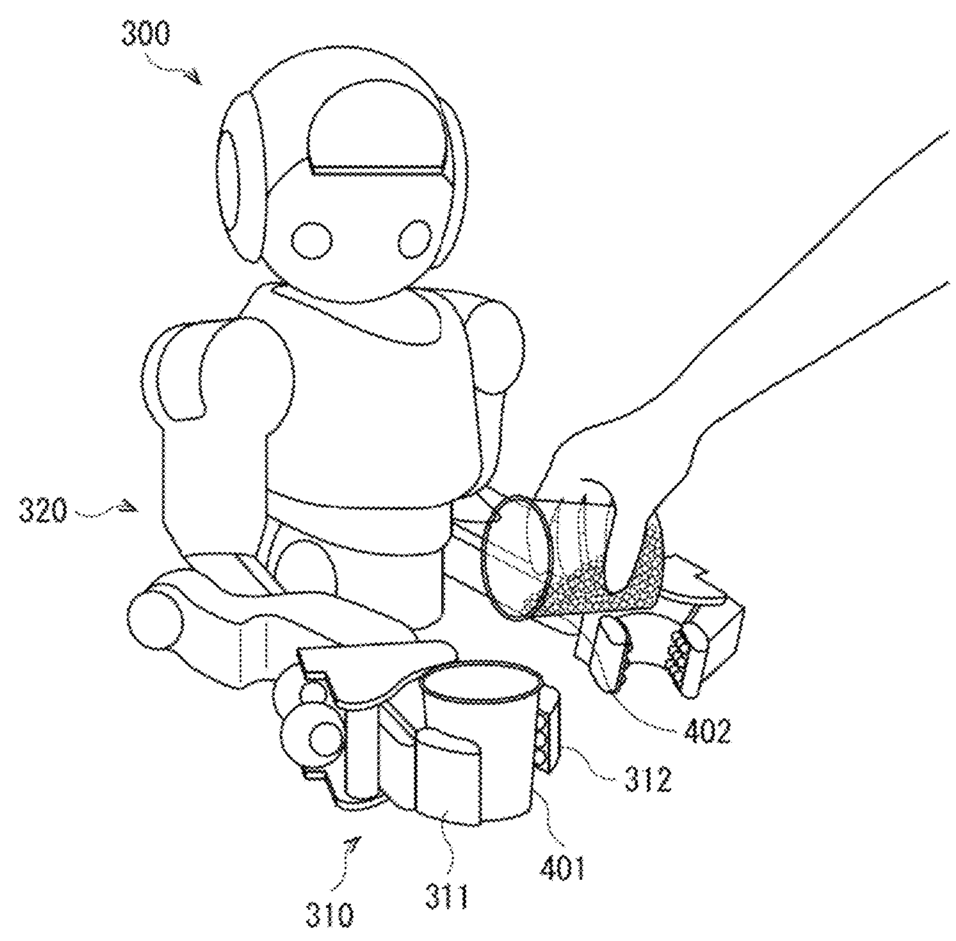
FIG. 12 is an explanatory diagram schematically illustrating a second example (Situation 2) of the evaluation environment of detection accuracy of the contact surface normal.
Figure 13:
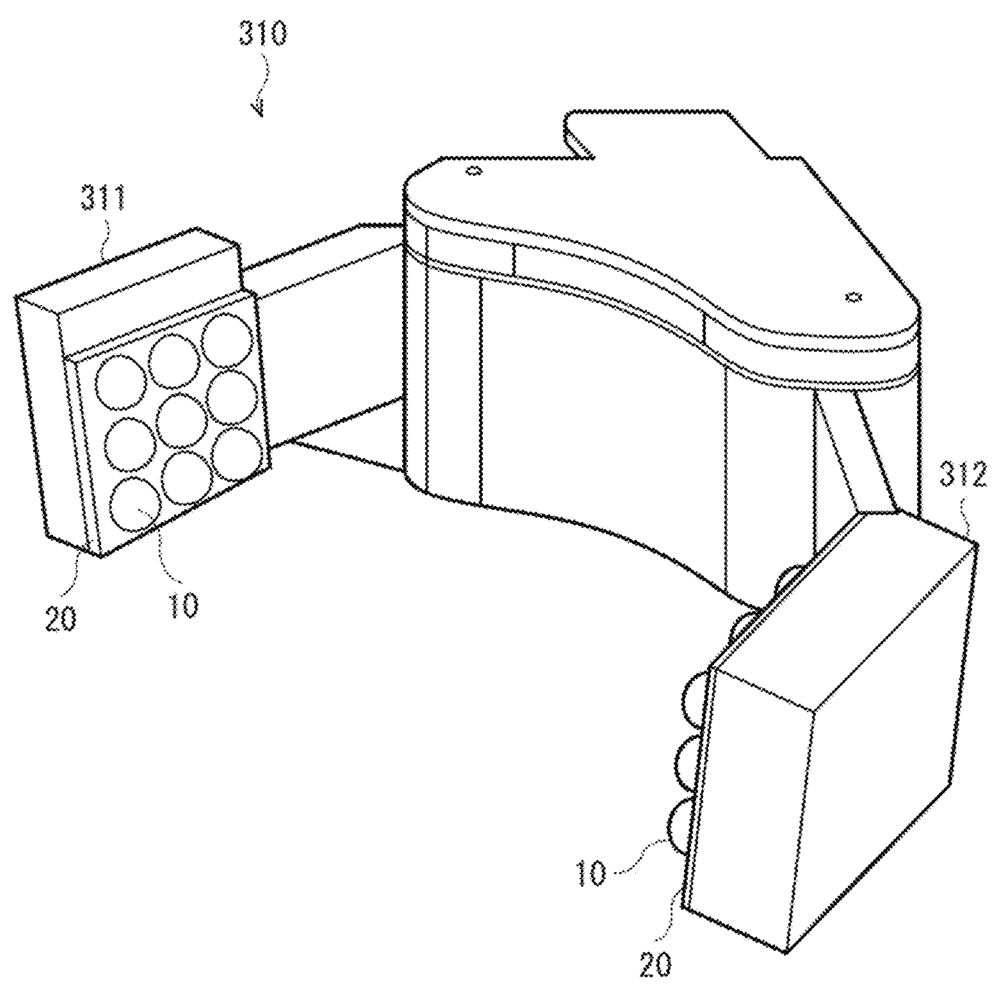
FIG. 13 is a configuration diagram illustrating an outline of a robot hand in the evaluation environment in FIG. 12.

Evaluation Example 1: Evaluation Example of Detection Accuracy of Contact Surface Normal During Gripping Operation FIG. 11 schematically illustrates a first example (Situation 1) of an evaluation environment of detection accuracy of the contact surface normal. FIG. 12 schematically illustrates a second example (Situation 2) of the evaluation environment of detection accuracy of the contact surface normal. FIG. 13 illustrates an outline of a robot hand 310 in the evaluation environment in FIG. 12.

The following two situations are assumed.

- A case where the object 100 is brought into vertical contact with the fingertip 1 that includes a plurality of curved elastic bodies 10 and has a structure similar to a structure in FIG. 8, and thereafter, shear displacement is caused (FIG. 11, Situation 1)
- A case where a paper cup 401 is gripped by the robot hand 310 so as not to be slipped, and iron balls 402 are poured into the paper cup 401 in the middle (FIG. 12, Situation 2)

In Situation 1, an evaluation tester 200 outlined in FIG. 11 is used. The evaluation tester 200 includes a Z stage 201 for adjusting the push-in amount, and an X stage (a translation/rotation stage 202) for causing shear displacement. The shape of the object 100 is a planar object.

In Situation 2, a robot 300 outlined in FIG. 12 is used. The robot 300 includes a robot hand 310 and an arm 320. The arm 320 is a 7-degrees-of-freedom arm. The robot hand 310 is a parallel gripper including a first finger section (a first fingertip) 311 and a second finger section (a second fingertip) 312 outlined in FIG. 13. The first finger section 311 and the second finger section 312 each have a structure similar to that of the fingertip 1 illustrated in FIG. 8.

Figure 14:
FIG. 14 is a characteristic diagram illustrating evaluation results of estimated angles of the contact surface normal in Situation 1 in FIG. 11.
Figure 14:
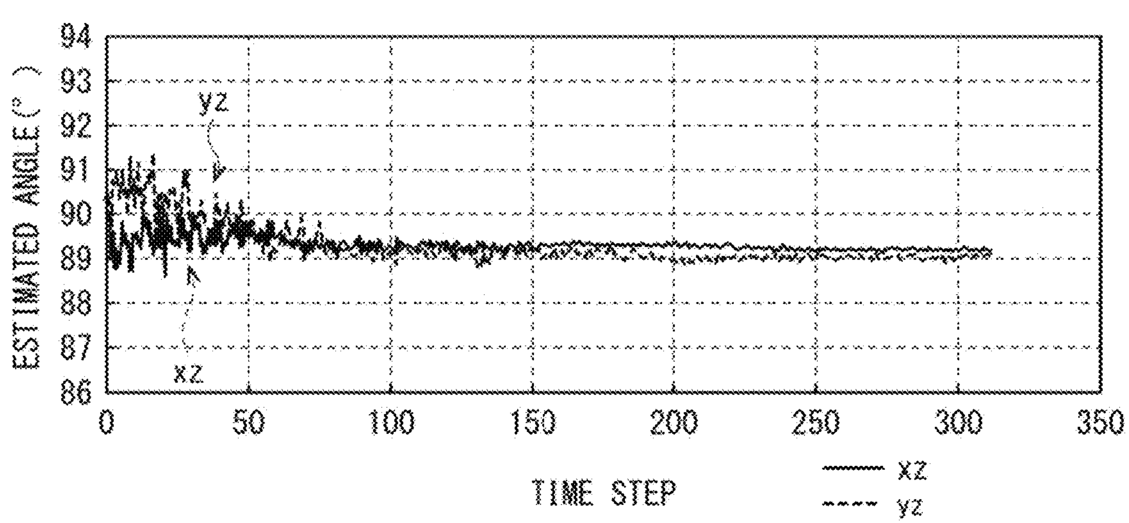
Figure 15:
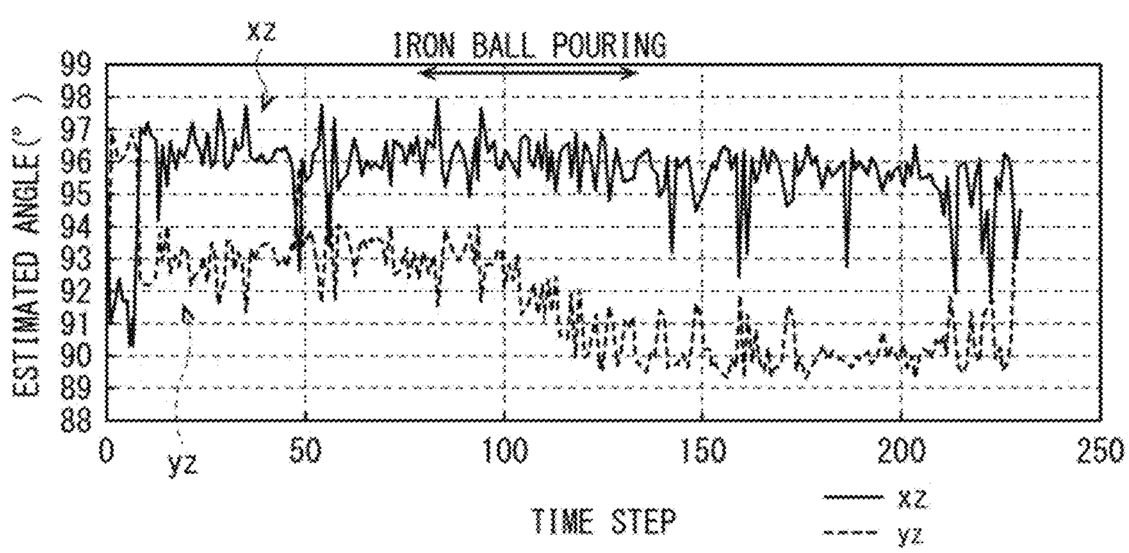
FIG. 15 is a characteristic diagram illustrating evaluation results of estimated angles of the contact surface normal in Situation 2 in FIG. 12.

FIG. 14 illustrates evaluation results of estimated angles of the contact surface normal in Situation 1 in FIG. 11. FIG. 15 illustrates evaluation results of estimated angles of the contact surface normal in Situation 2 in FIG. 12. FIG. 14 and FIG. 15 each illustrate evaluation results of estimated angles in an xz direction and a yz direction.

The existing technologies has an issue that the contact surface normal is not successfully detected due to shear displacement; however, it was confirmed from the results in FIG. 14 that the contact surface normal was detected with a standard deviation of 0.3° and a maximum error of 1.35° by the present technology. Further, in Situation 2, when the iron balls 402 are poured into the paper cup 401, the weight of the paper cup 401 becomes heavy and the grip force is increased so as to prevent a slip; therefore, the paper cup 401 gradually collapses, and the contact surface normal approaches 90°. It was confirmed from the results in FIG. 15 that estimation results agreed with those.

Figure 16:
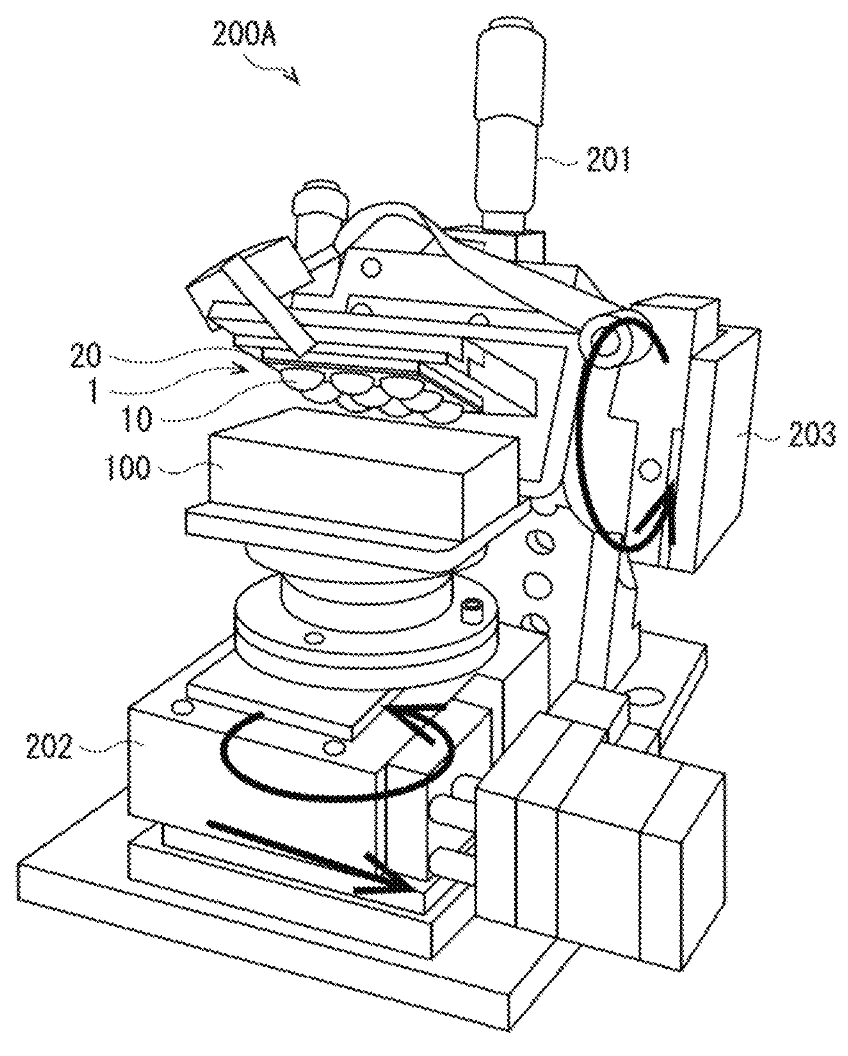
FIG. 16 is an explanatory diagram schematically illustrating an evaluation environment of detection accuracy of a contact surface normal of another object shape.

Evaluation Example 2: Evaluation Example of Detection Accuracy of Contact Surface Normal of Another Object Shape FIG. 16 schematically illustrates an evaluation environment of detection accuracy of a contact surface normal of another object shape. Although an evaluation tester 200A having a structure basically similar to that of the evaluation tester 200 in FIG. 11 is used, the evaluation tester 200A further includes a rotation stage 203 in addition to the Z stage 201 and the translation/rotation stage 202.

Figure 17:
FIG. 17 is an explanatory diagram schematically illustrating a planar evaluation object.
Figure 17:
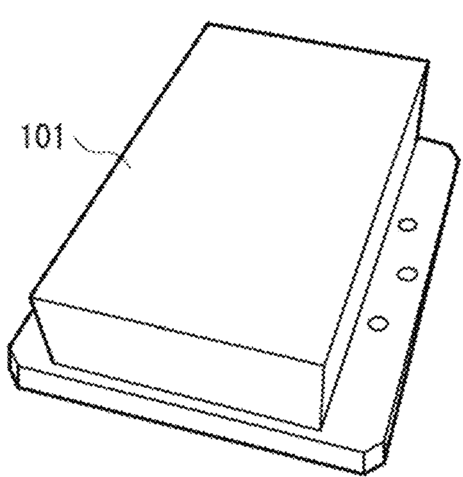
Figure 18:
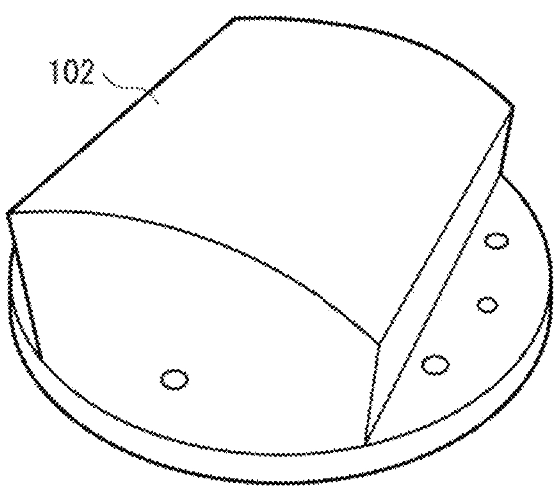
FIG. 18 is an explanatory diagram schematically illustrating a columnar evaluation object.
Figure 19:
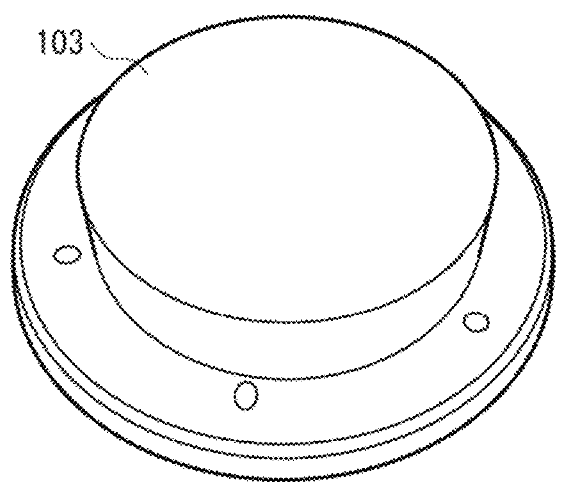
FIG. 19 is an explanatory diagram schematically illustrating a spherical evaluation object.
Figure 20:
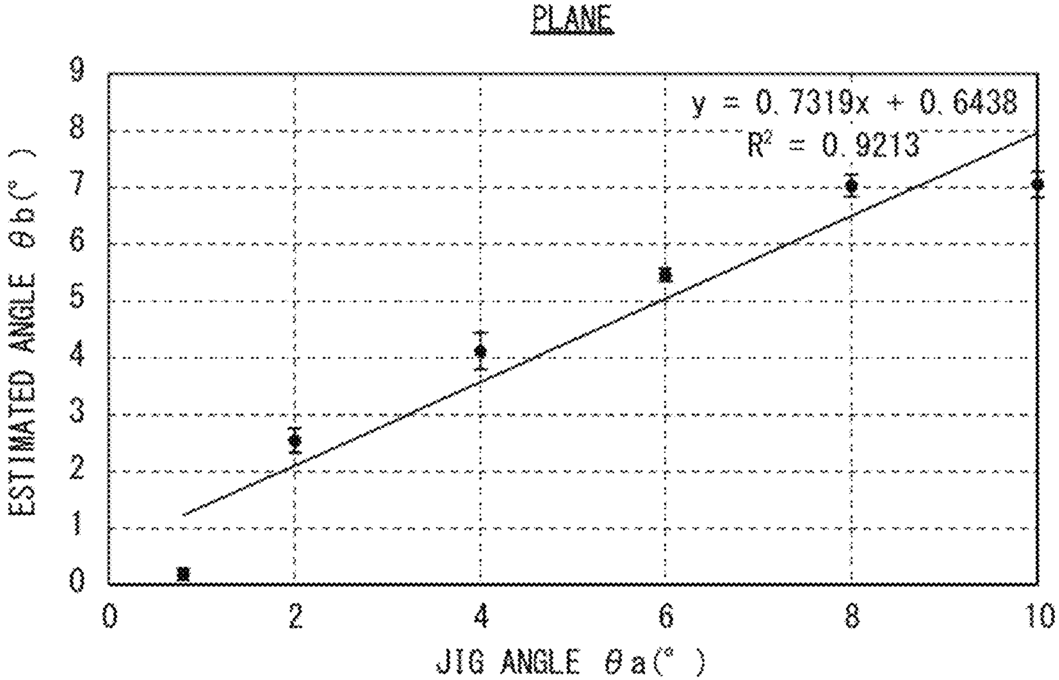
FIG. 20 is a characteristic diagram illustrating an evaluation result in a case where the evaluation object has a planar shape.
Figure 21:
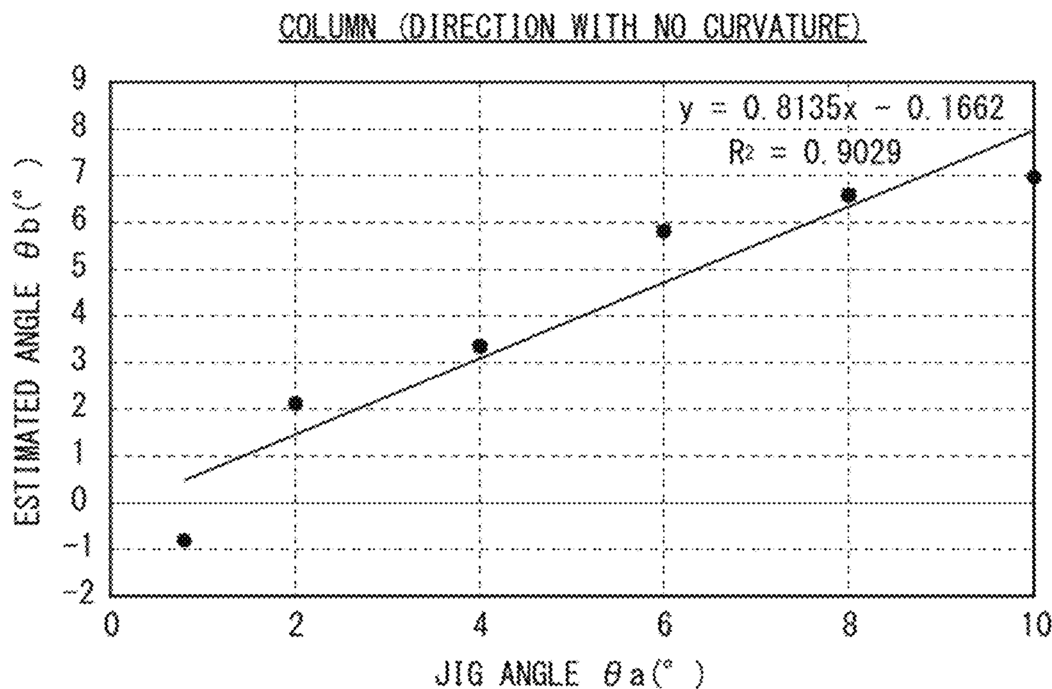
FIG. 21 is a characteristic diagram illustrating an evaluation result in a case where the evaluation object has a columnar shape and a detection direction is a direction with no curvature.
Figure 22:
FIG. 22 is a characteristic diagram illustrating an evaluation result in a case where the evaluation object has a columnar shape and the detection direction is a direction with a curvature.
Figure 22:
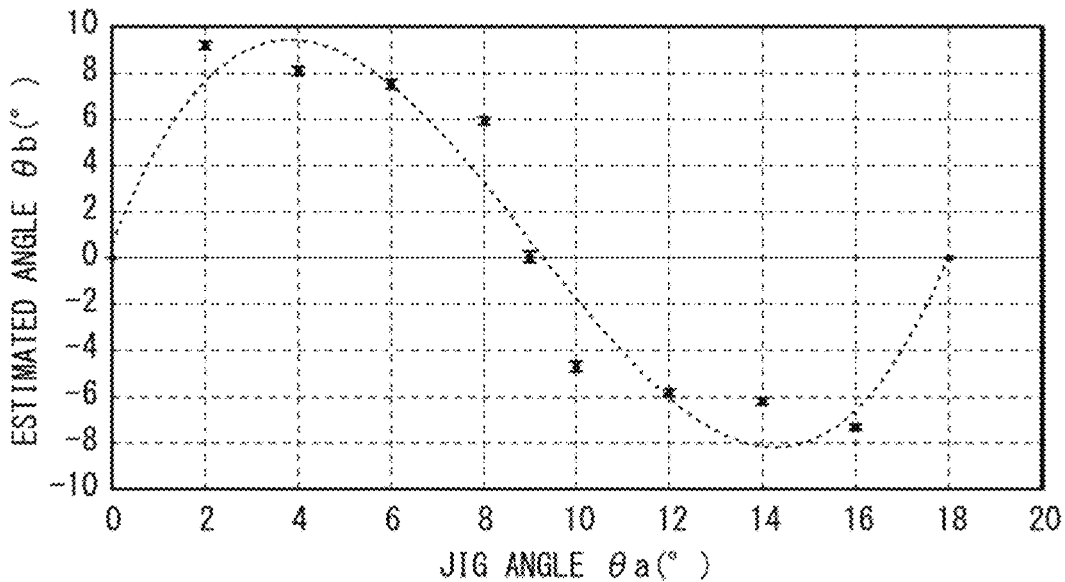
Figure 23:
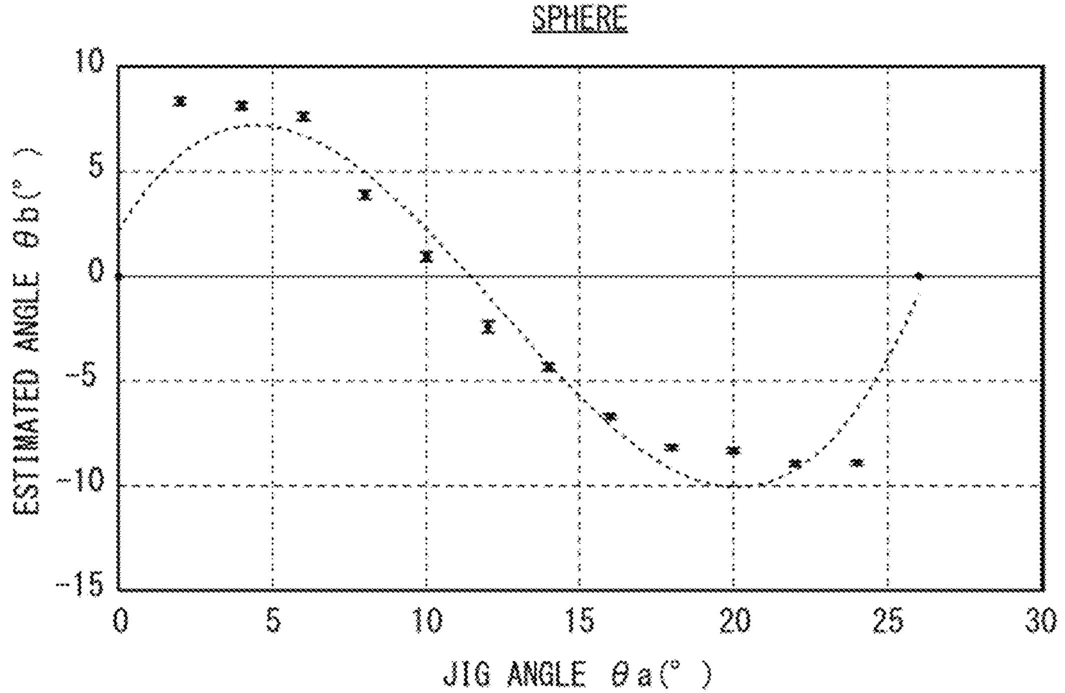
FIG. 23 is a characteristic diagram illustrating an evaluation result in a case where the evaluation object has a spherical shape.

FIGS. 17 to 19 each illustrate an example of an evaluation object. Three types of evaluation objects were prepared: a planar object 101, a columnar object 102, and a spherical object 103. Data was collected in 2° increments from a contact angle of 0° to a contact angle of 10°. For the columnar object 102, two types of data were collected: data in a direction with no curvature and data in a direction with a curvature.

Figure 24:
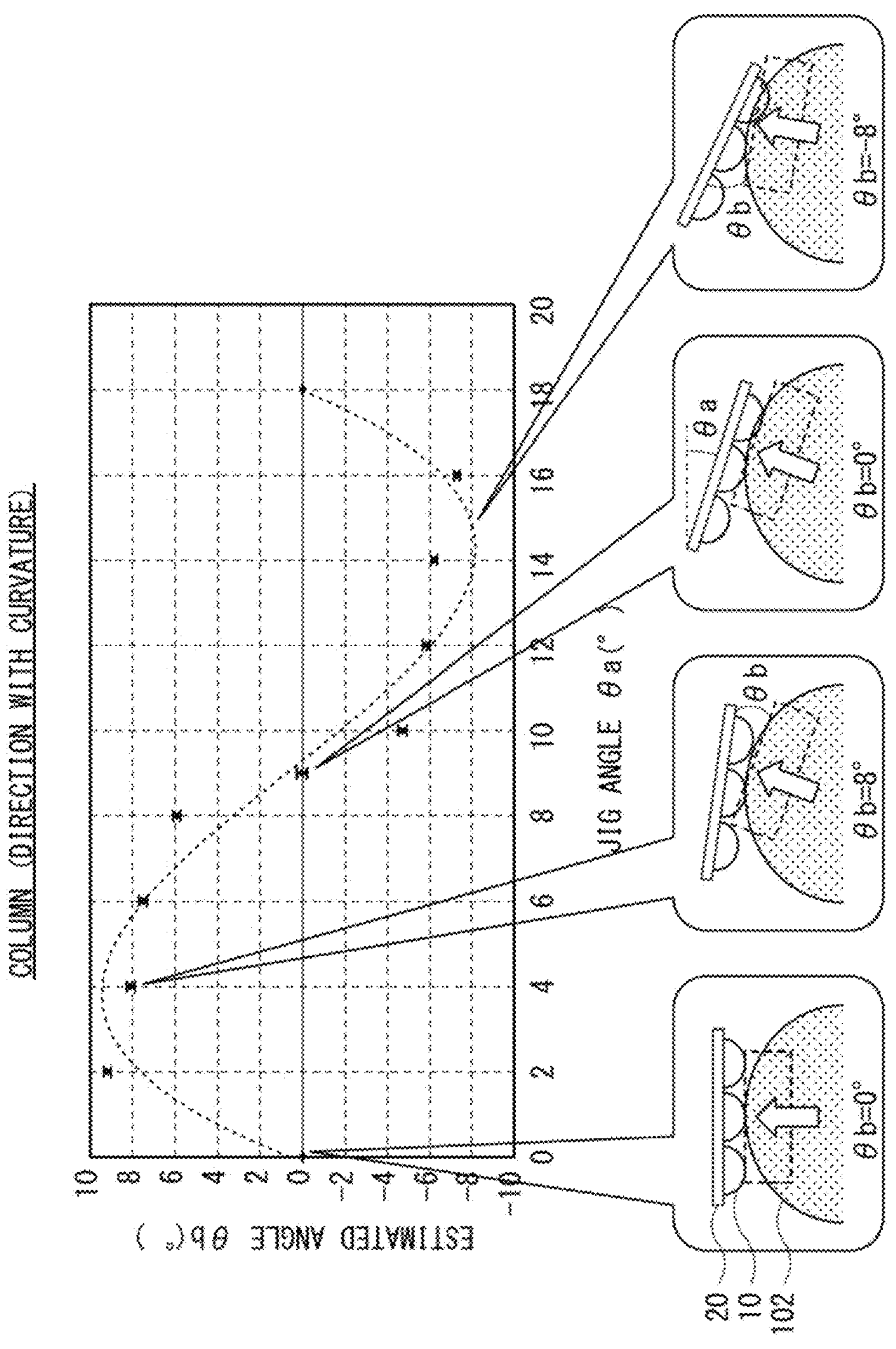
FIG. 24 is an explanatory diagram of an evaluation result in a case where the evaluation object has a columnar shape and the detection direction is a direction with a curvature.

FIGS. 20 to 25 each illustrate an evaluation result of each evaluation object. In FIGS. 20 to 24, a horizontal axis indicates a jig angle θ*a*) (°, and a vertical axis indicates an estimated angle θb) (°. The estimated angle θb depends on the Young's modulus of the object; therefore, it is not possible to guarantee an absolute value. However, it was confirmed that linearity and reproducibility were high. It is to be noted that, in FIGS. 20 to 25, the linearity is higher as a determination coefficient $R^2$ approaches 1. Each measurement was performed five times. A standard deviation illustrated in FIG. 25 indicates variation in measurement values of respective measurements. It should be noted that for the columnar object 102 in the direction with a curvature and the spherical object 103, a jig angle object does not have a correct value, because object surfaces thereof have a curvature. It is found that as the jig angle object is changed, the shape of the object is detected, which allows for detection of the contact surface normal. For reference, FIG. 24 illustrates an image diagram. It was confirmed that variation was small and the reproducibility was high also for an object having a shape with a curvature on a surface such as a column and a sphere.

Example of Hand Control Method for Stable Gripping of Unknown Object on Basis of Initial Slip, Contact Surface Normal, and Contact Point In the gripping control device 51, the calculation section calculates a fingertip force (a grip force) of each fingertip 1 on the gripped object on the basis of the initial slip of each fingertip 1, the contact surface normal of each fingertip 1, and the contact point of each fingertip 1. The gripping control device 51 performs hand control for stably gripping an unknown object on the basis of the calculated fingertip force (grip force).

Figure 27:
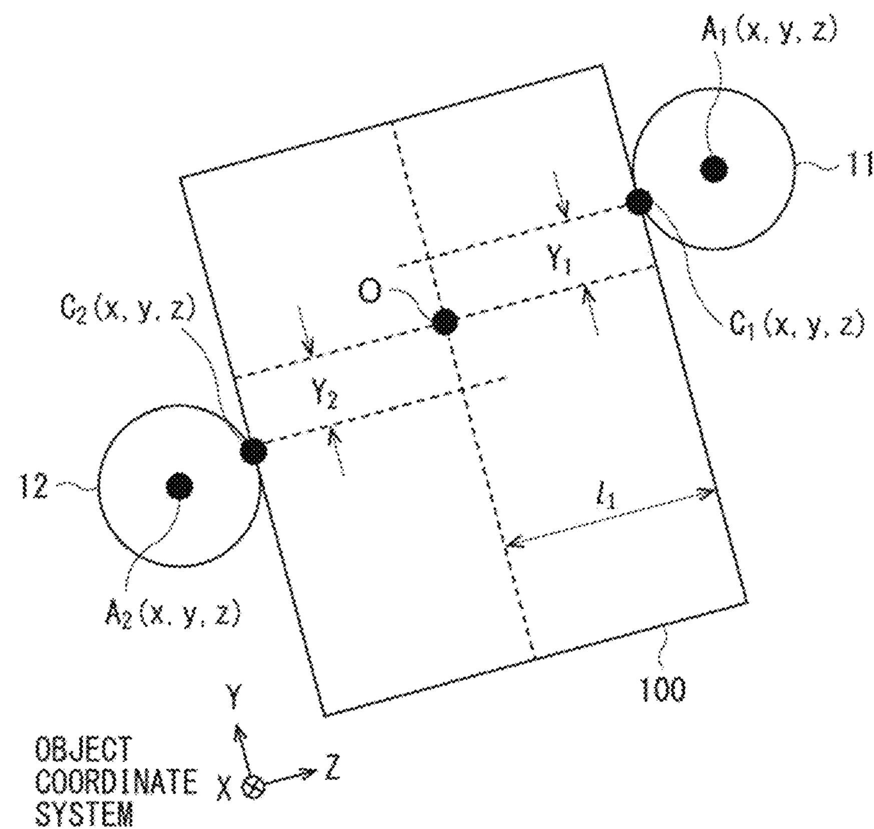
FIG. 27 is an explanatory diagram illustrating an example of parameters used for hand control.

FIG. 26 schematically illustrates an example of a control block diagram of hand control by the gripping control device 51. In addition, FIG. 27 illustrates an example of parameters used for hand control.

The gripping control device 51 includes, as control blocks for hand control, a slip detection/grip force determination section 21, a grip controller 22, a damping section 24, and a subtracter 25. In the damping section 24, $Da_i$ is a damping coefficient, and S is a differential term.

The slip detection/grip force determination section 21 performs detection and calculation of the initial slip by the method described above on the basis of a result of detection by the sensor 20. In addition, the slip detection/grip force determination section 21 calculates a target grip force (fingertip force) $f_d$ on the basis of results of detection and calculation of the initial slip and the contact surface normal, and inputs the target grip force (fingertip force) $f_d$ as a control signal to the grip controller 22.

Hand control is performed on a hand 23 on the basis of a joint torque t calculated by the grip controller 22, the damping section 24, and the subtracter 25. The hand 23 includes, for example, a first finger section (a first fingertip) 11 and a second finger section (a second fingertip) 12 as a plurality of fingertips as illustrated in FIG. 27, and grips the object 100. The first finger section 11 and the second finger section 12 each have a structure including a plurality of elastic bodies 10 each having a curved surface shape as with the fingertip 1 illustrated in FIG. 8; however, the structures of the first finger section 11 and the second finger section 12 are simplified in FIG. 27. It is to be noted that the number of fingertips of the hand is not limited to two, and may be any number.

An example of a control signal ti to be outputted from the grip controller 22 is represented by Equation (5), where $J(q_i)$ is a Jacobian matrix related to a joint angle $q_i$ and a fingertip hemisphere center position of each finger of the hand 23, $A_i$ is a fingertip center of the hand 23, O is a geometric center of each contact point between each fingertip of the hand 23 and the object 100, $C_i$ is each contact point between each fingertip of the hand 23 and the object 100, and $f_d$ is a target grip force (fingertip force).

[Math. 5]

$$\tau_i = f_d J(q_i)^T (O - A_i) \tag{5}$$

$$O = \frac{1}{N}\sum_{i=1}^{N} C_i$$

The control signal ti (Equation (5)) satisfies that a resultant force and a resultant moment are 0 by using each fingertip force vector from each contact point $C_i$ between each fingertip of the hand 23 and the object 100 to the geometric center O of each contact point $C_i$. It is possible to transform the control signal $\tau_i$ (Equation (5)) into Equation (6), where $X_i$ and $Y_i$ are contact surface tangential distances from the geometric center O to the contact point $C_i$ of each fingertip, $e_{Xi}$ and $e_{Yi}$ are contact surface tangential unit vectors, and $e_{Zi}$ is a contact surface normal unit vector.

In Equation (6), the first term indicates a control term in a fingertip normal direction, and the second term and the third term each indicate a control term in a fingertip tangential direction. The second and third terms are terms that compensate for a moment to be received by each fingertip from the object 100.

[Math. 6]

$$\tau_i = f_d J(q_i)^T e_{Zi}(l_i + r_i - \Delta r) + f_d J(q_i)^T e_{Xi} X_i + f_d J(q_i)^T e_{Yi} Y_i \tag{6}$$

Figure 28:
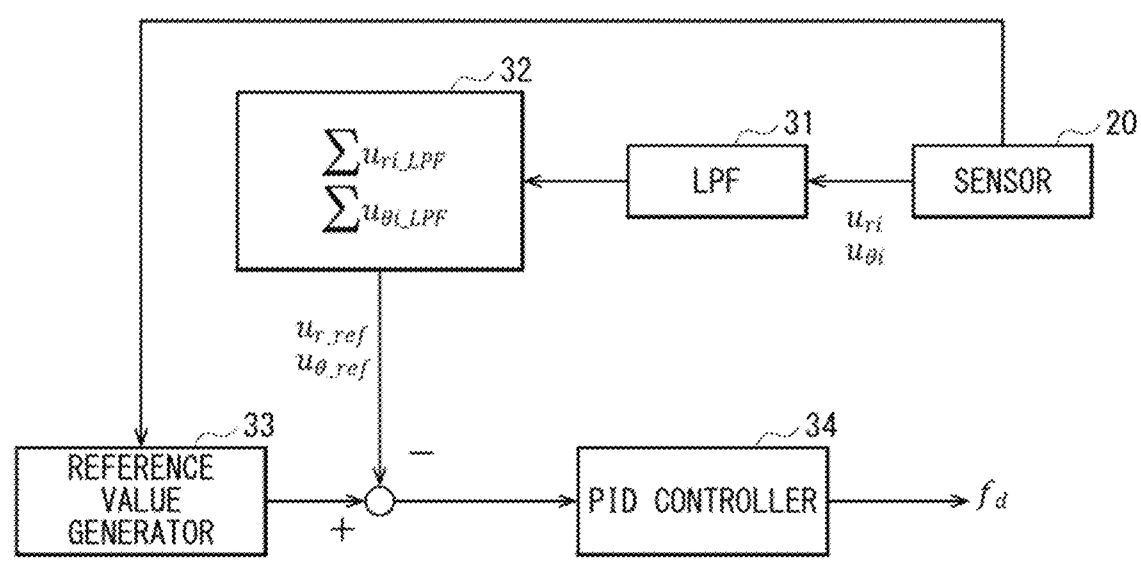
FIG. 28 is a block diagram schematically illustrating a configuration example of a slip detection/grip force determination section.

In order to stably grip an unknown object, an appropriate grip force $f_d$ is set. In the present technology, the grip force $f_d$ is determined with use of the initial slip. FIG. 28 schematically illustrates a configuration example of the slip detection/grip force determination section 21. The slip detection/grip force determination section 21 includes a LPF (lowpass filter) 31, a reference value generator 32, and a PID (Proportional Integral Differential) controller 33.

It is possible to detect the initial slip from displacement in the shear direction and the contact surface information. It is possible to estimate the shear displacement from movement information about a pressure center position with use of, for example, a pressure distribution sensor. For example, as illustrated in FIG. 28, it is possible for the target grip force $f_d$ to use an algorithm for determining a grip force that prevents occurrence of the initial slip with use of PID control.

From the above, it is possible to prevent occurrence of a slip with use of the initial slip, and at the same time, to achieve three-dimensional force balance with use of the contact surface normal and the contact point.

Example of Method of Controlling Position and Orientation of Unknown Object on Basis of Contact Surface Normal and Contact Point Furthermore, description is given of a method of controlling a position and an orientation of the object 100 (gravity compensation) with use of the contact surface normal and the contact point, in addition to the hand control described above.

In the gripping control device 51, the calculation section may calculate, as the fingertip force of each fingertip 1, a fingertip force for controlling the position and the orientation of the gripped object on the basis of the contact surface normal of each fingertip 1 and the contact point of each fingertip 1.

Figure 29:
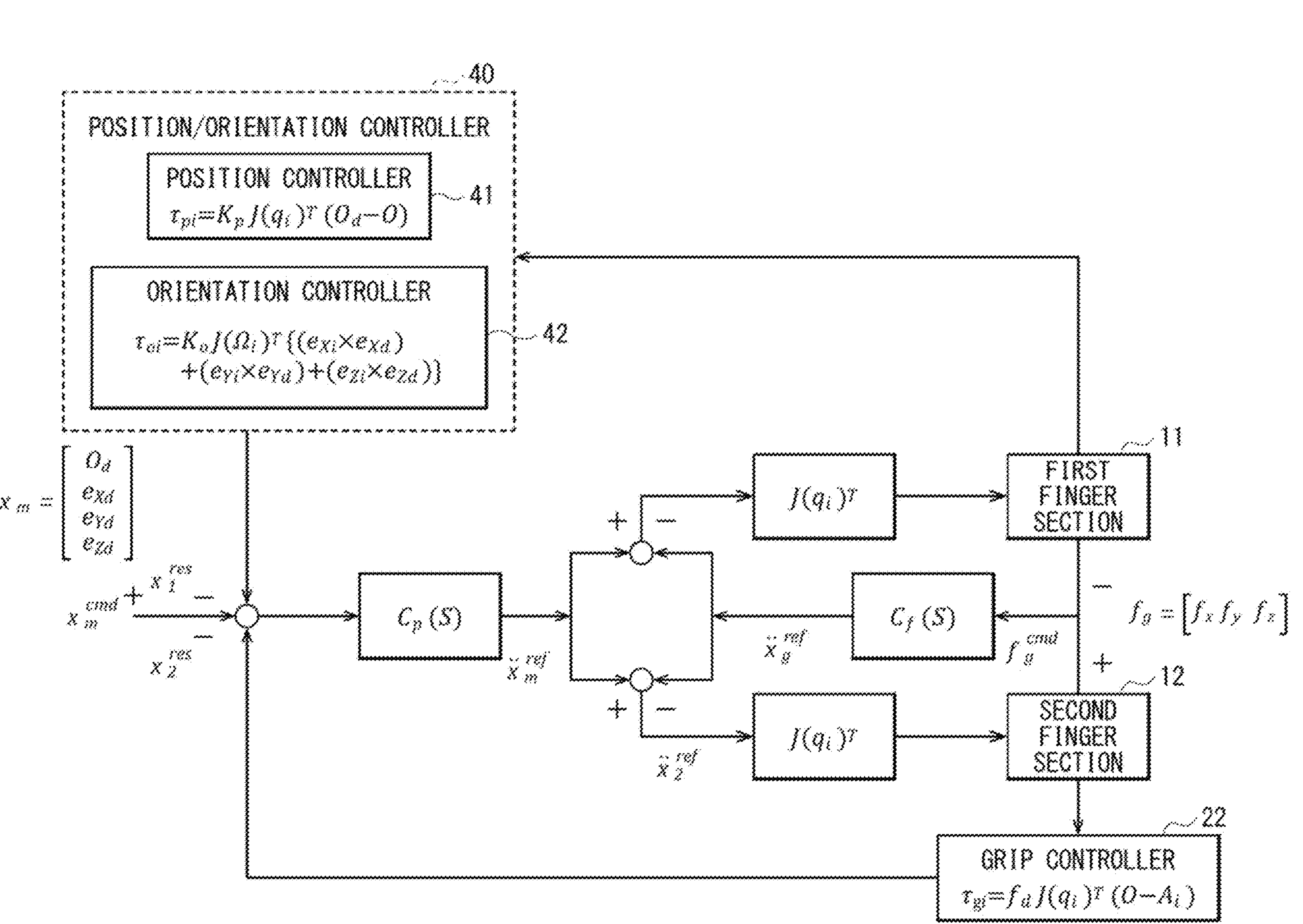
FIG. 29 is a block diagram schematically illustrating an example of position and orientation control of a gripped object by the gripping control device according to the first embodiment.

FIG. 29 schematically illustrates an example of a diagram of a control block that performs position and orientation control of the gripped object by the gripping control device 51.

The gripping control device 51 includes a position/orientation controller 40 as the control block that performs position and orientation control of the gripped object. The position/orientation controller 40 includes a position controller 41 and an orientation controller 42. It is to be noted that FIG. 29 illustrates an example in which position and orientation control of the gripped object is performed by the first finger section (the first fingertip) 11 and the second finger section (the second fingertip) 12; however, the number of fingertips is not limited to two, and may be any number.

For the position and orientation control of the gripped object, mode transformation by discrete Fourier transform (DFT transformation) is used (Equation (7)). In Equation (7), G is a real scalar value after the mode transformation, g is a real scalar value before the mode transformation, and W is a complex scalar value representing a rotator. N is a scalar value representing any integer.

[Math. 7]

$$G = F_N g \tag{7}$$

It is possible to represent DFT with use of a matrix $F_N$ represented by the following Equation (8). Here, the DFT matrix is used to extract a gripping mode and a manipulation mode.

[Math. 8]

$$F_N = \begin{bmatrix} W^0 & W^0 & W^0 & & W^0 \\ W^0 & W^1 & W^2 & \cdots & W^{N-1} \\ W^0 & W^2 & W^4 & & W^{2(N-1)} \\ & \vdots & & \ddots & \vdots \\ W^0 & W^{N-1} & W^{2(N-1)} & \cdots & W^{(N-1)^2} \end{bmatrix} \tag{8}$$

In Equation (7), g is an external force $[f_1, \ldots f_n]^T$ to be applied to an n-finger robot finger, or a position $[x_1, \ldots x_n]^T$ of the n-finger robot finger. G is an extraction mode related to a force or position, and a component thereof is divided into the gripping mode and the manipulation mode. The "gripping mode" means force balance control, and the "manipulation mode" means position and orientation control of the gravity center of an object. Division into the "gripping mode" and the "manipulation mode" by a mode conversion matrix in which row vectors are orthogonal to each other makes it possible to independently perform control without interfering with each other.

It is possible to respectively represent a position control signal $\tau_{pi}$ and an orientation control signal $\tau_{Oi}$ for the gravity center of an object that are the manipulation mode by, for example, Equation (9) and Equation (10), where $O_d$ is a target object position, $K_p$ is a position gain, $e_{Xd}$, $e_{Yd}$, and $e_{Zd}$ are target object orientations, $K_O$ is an orientation gain, and $J(\Omega_i)$ is a Jacobian matrix related to each joint angle of an orientation angular velocity vector at a fingertip hemisphere center position.

[Math. 9]

$$\tau_{pi} = K_p J(q_i)^T (O_d - O) \tag{9}$$

[Math. 10]

$$\tau_{oi} = K_o J(\Omega_i)^T \{(e_{Xi} \times e_{Xd}) + (e_{Yi} \times e_{Yd}) + (e_{Zi} \times e_{Zd})\} \tag{10}$$

Figure 30:
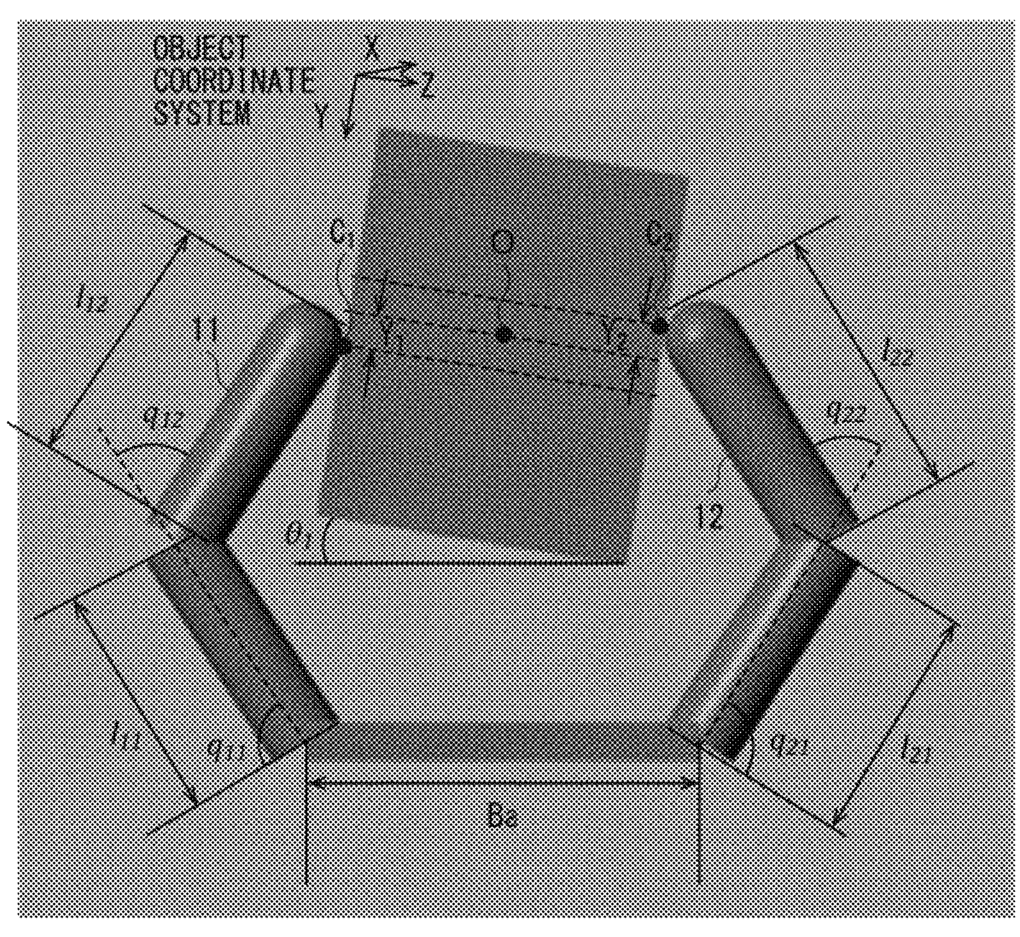
FIG. 30 is a configuration diagram schematically illustrating an example of a robot hand used for evaluation of a hand control method by the gripping control device according to the first embodiment.
Figure 31:
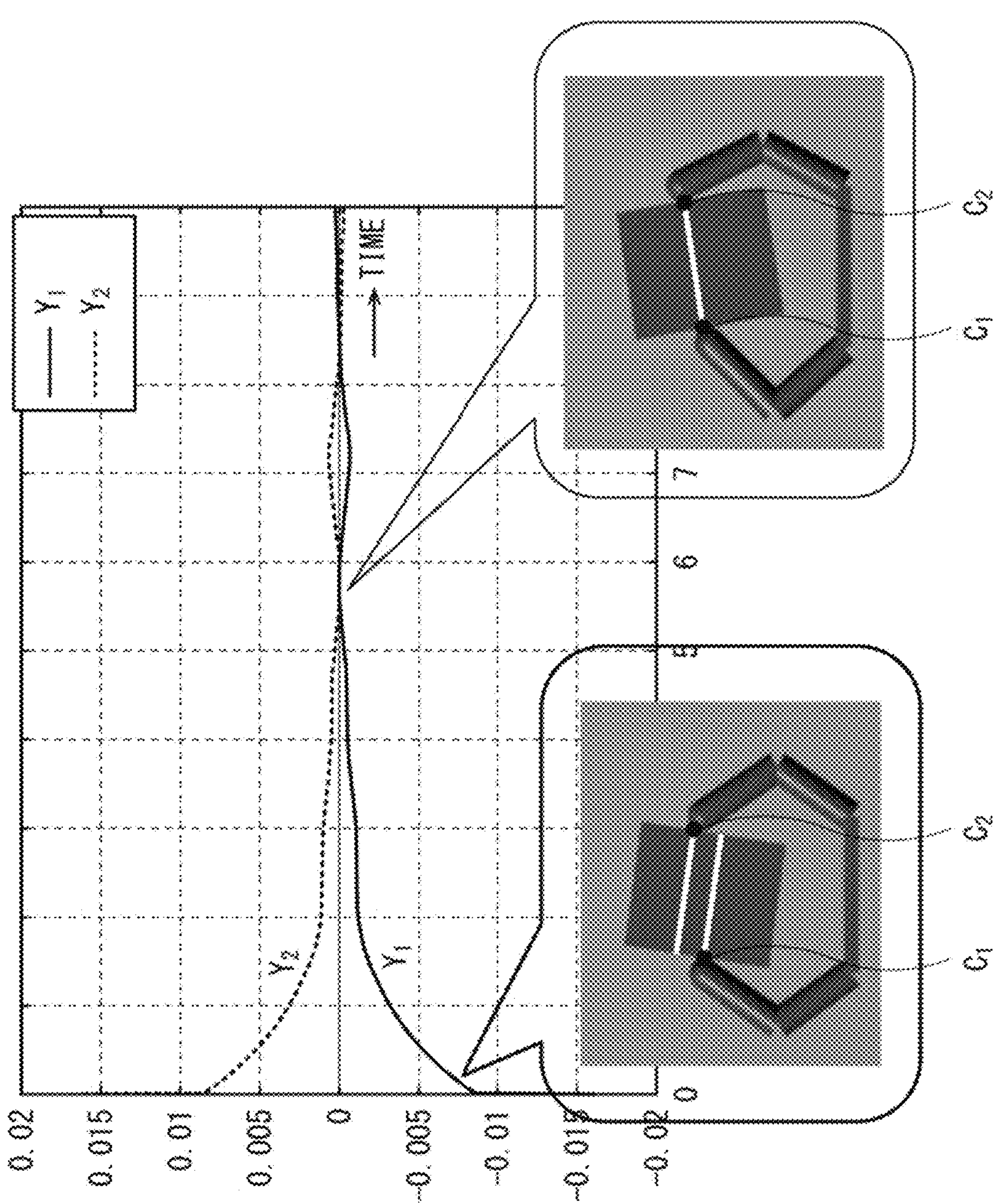
FIG. 31 is an explanatory diagram illustrating a simulation result of evaluation of the hand control method by the gripping control device according to the first embodiment.

Evaluation Example of Hand Control Method for Stable Gripping of Unknown Object on Basis of Initial Slip, Contact Surface Normal, and Contact Point FIG. 30 schematically illustrates an example of a robot hand used for evaluation of a hand control method by the gripping control device 51. FIG. 31 illustrates a result of a simulation in a case where a hand control method according to the present technology described above is applied to a two-finger four-degrees-of-freedom (pitch-pitch/pitch-pitch) robot hand illustrated in FIG. 30.

A simulation environment used here is MATLAB R2019b. FIG. 32 illustrates physical parameters of the robot hand used for the simulation. In addition, FIG. 33 illustrates physical parameters of the gripped object and control parameters of the hand control. As can be seen from the result of the simulation in FIG. 31, values of $Y_1$ and $Y_2$ gradually approach each other. In other words, it is confirmed that it is possible to perform control so as to maintain force-moment balance with use of rolling of the fingertips.

1.3 Effects

As described above, according to the gripping control device according to the first embodiment, the contact surface normal of each fingertip 1 to the gripped object is calculated on the basis of displacement in the normal direction of each of the plurality of elastic bodies 10 each having a curved surface shape. The plurality of elastic bodies 10 is provided for each of the plurality of fingertips 1 that is in contact with the gripped object. This makes it possible to achieve stable gripping of an unknown object by using the contact surface normal.

According to the gripping control device according to the first embodiment, the following effects are achieved.

(1) Enabling simultaneous detection of an initial slip that occurs during object gripping, a contact surface normal, and a contact point makes it possible to grip an unknown object (no prior information about the object 100).

(2) Detecting the initial slip to prevent a slip and solving force-moment balance with use of the contact surface normal and the contact point makes it possible to stably grip an unknown object with a minimum necessary force.

(3) Application to multiple-freedom hand control is possible without depending on a hand configuration.

(4) In a case where application to a multiple-degrees-of-freedom hand becomes possible, grip stability is improved and a range of grippable objects is expanded.

It is to be noted that the effects described herein are merely illustrative and non-limiting, and other effects may be included. The same applies to effects of the following other embodiments.

2. Other Embodiments

The present technology is not limited to description of the embodiment described above, and may be modified in a variety of ways.

For example, the present technology may have the following configurations.

According to the present technology having the following configurations, a contact surface normal of each of a plurality of fingertips to a gripped object is calculated on the basis of displacement in a normal direction of each of a plurality of elastic bodies each having a curved surface shape. The plurality of elastic bodies is provided for each of the plurality of fingertips that is in contact with the gripped object. This makes it possible to achieve stable gripping of an unknown object with use of the contact surface normal.

(1)

A gripping control device including:

a detector that detects displacement in a normal direction of each of a plurality of elastic bodies each having a curved surface shape, the plurality of elastic bodies provided for each of a plurality of fingertips that is in contact with a gripped object; and a calculation section that calculates a contact surface normal of each of the fingertips to the gripped object on the basis of a result of detection by the detector.

(2)

The gripping control device according to (1), in which the calculation section calculates the contact surface normal of each of the fingertips on the basis of a contact surface of each of the fingertips with the gripped object calculated based on the displacement in the normal direction of each of the elastic bodies for each of the fingertips.

(3)

The gripping control device according to (2), in which the calculation section further calculates a contact point between each of the fingertips and the gripped object on the basis of the contact surface of each of the fingertips with the gripped object.

(4)

The gripping control device according to any one of (1) to (3), in which the detector calculates the displacement in the normal direction of each of the elastic bodies from a force in the normal direction acting on each of the elastic bodies and contact surface information about each of the elastic bodies with respect to the gripped object.

(5)

The gripping control device according to (4), in which the detector calculates the force in the normal direction acting on each of the elastic bodies from a maximum pressure and the contact surface information, the maximum pressure calculated on the basis of a result of detection by a pressure distribution sensor provided on a bottom surface of each of the elastic bodies.

(6)

The gripping control device according to (3), in which the detector further detects displacement in a shear direction of each of the fingertips.

(7)

The gripping control device according to (6), in which the detector calculates the displacement in the shear direction on the basis of movement information about a pressure center position of each of the fingertips calculated on the basis of a result of detection by a pressure distribution sensor provided on a bottom surface of each of the elastic bodies.

(8)

The gripping control device according to (6) or (7), in which the detector further detects an initial slip of each of the fingertips that occurs while gripping the gripped object.

(9)

The gripping control device according to (8), in which the calculation section further calculates a fingertip force of each of the fingertips on the gripped object on the basis of the initial slip of each of the fingertips, the contact surface normal of each of the fingertips, and the contact point of each of the fingertips.

(10)

The gripping control device according to (9), in which the calculation section calculates, as the fingertip force of each of the fingertips, a fingertip force that prevents occurrence of the initial slip of each of the fingertips.

(11)

The gripping control device according to (9) or (10), in which the calculation section calculates, as the fingertip force of each of the fingertips, a fingertip force that causes a resultant force and a resultant moment to be 0, on the basis of the contact surface normal of each of the fingertips and the contact point of each of the fingertips.

(12)

The gripping control device according to any one of (9) to (11), in which the calculation section calculates, as the fingertip force of each of the fingertips, a fingertip force for controlling a position and an orientation of the gripped object, on the basis of the contact surface normal of each of the fingertips and the contact point of each of the fingertips.

(13)

The gripping control device according to (4), in which the detector detects the force in the normal direction acting on each of the elastic bodies by a force sensor provided on a bottom surface of each of the elastic bodies.

(14)

The gripping control device according to (4), in which the detector calculates the force in the normal direction acting on each of the elastic bodies from a maximum pressure and the contact surface information, the maximum pressure calculated on the basis of a result of detection by an optical tactile sensor provided on a bottom surface of each of the elastic bodies.

(15)

The gripping control device according to (1), in which the detector detects the displacement in the normal direction of each of the elastic bodies by a displacement sensor provided on a bottom surface of each of the elastic bodies.

(16)

The gripping control device according to (6), in which the detector detects the displacement in the shear direction by an optical tactile sensor provided on a bottom surface of each of the elastic bodies.

(17)

The gripping control device according to (6), in which the detector detects the displacement in the shear direction by a force sensor provided on a bottom surface of each of the elastic bodies.

(18)

A gripping control method including:

detecting displacement in a normal direction of each of a plurality of elastic bodies each having a curved surface shape, the plurality of elastic bodies provided for each of a plurality of fingertips that is in contact with a gripped object; and calculating a contact surface normal of each of the fingertips to the gripped object on the basis of a result of the detection.

It should be understood by those skilled in the art that various modifications, combinations, sub-combinations, and alterations may occur depending on design requirements and other factors insofar as they are within the scope of the appended claims or the equivalents thereof.

The invention claimed is:

1. A gripping control device comprising:

circuitry configured to calculate displacement in a normal direction of each of a plurality of elastic bodies each having a curved surface shape, the plurality of elastic bodies provided for each of a plurality of fingertips of a gripping device that is in contact with a gripped object;

calculate a contact surface normal of each of the plurality of fingertips to the gripped object by approximating a spatial distribution of the plurality of the displacements in the normal direction to a plane to determine an inclination of a contact surface of each of the plurality of fingertips relative to a coordinate axis of the fingertips, the contact surface normal being calculated based on the determined inclination; and control the gripping device using the calculated contact surface normal of each of the plurality of fingertips to the gripped object.

2. The gripping control device according to claim 1, wherein the circuitry calculates the contact surface normal of each of the fingertips on a basis of a contact surface of each of the fingertips with the gripped object calculated based on the displacement in the normal direction of each of the elastic bodies for each of the fingertips.

3. The gripping control device according to claim 2, wherein the circuitry further calculates a contact point between each of the fingertips and the gripped object on a basis of the contact surface of each of the fingertips with the gripped object.

4. The gripping control device according to claim 1, wherein the circuitry calculates the displacement in the normal direction of each of the elastic bodies from a force in the normal direction acting on each of the elastic bodies and contact surface information about each of the elastic bodies with respect to the gripped object.

5. The gripping control device according to claim 4, wherein the circuitry calculates the force in the normal direction acting on each of the elastic bodies from a maximum pressure and the contact surface information, the maximum pressure calculated on a basis of a result of detection by a pressure distribution sensor provided on a bottom surface of each of the elastic bodies.

6. The gripping control device according to claim 3, wherein the circuitry further calculates displacement in a shear direction of each of the fingertips.

7. The gripping control device according to claim 6, wherein the circuitry calculates the displacement in the shear direction on a basis of movement information about a pressure center position of each of the fingertips calculated on a basis of a result of detection by a pressure distribution sensor provided on a bottom surface of each of the elastic bodies.

8. The gripping control device according to claim 6, wherein the circuitry further detects an initial slip of each of the fingertips that occurs while gripping the gripped object.

9. The gripping control device according to claim 8, wherein the circuitry further calculates a fingertip force of each of the fingertips on the gripped object on a basis of the initial slip of each of the fingertips, the contact surface normal of each of the fingertips, and the contact point of each of the fingertips.

10. The gripping control device according to claim 9, wherein the circuitry calculates, as the fingertip force of each of the fingertips, a fingertip force that prevents occurrence of the initial slip of each of the fingertips.

11. The gripping control device according to claim 9, wherein the circuitry calculates, as the fingertip force of each of the fingertips, a fingertip force that causes a resultant force and a resultant moment to be 0, on a basis of the contact surface normal of each of the fingertips and the contact point of each of the fingertips.

12. The gripping control device according to claim 9, wherein the circuitry calculates, as the fingertip force of each of the fingertips, a fingertip force for controlling a position and an orientation of the gripped object, on a basis of the contact surface normal of each of the fingertips and the contact point of each of the fingertips.

13. The gripping control device according to claim 4, wherein the circuitry detects the force in the normal direction acting on each of the elastic bodies by a force sensor provided on a bottom surface of each of the elastic bodies.

14. The gripping control device according to claim 4, wherein the circuitry calculates the force in the normal direction acting on each of the elastic bodies from a maximum pressure and the contact surface information, the maximum pressure calculated on a basis of a result of detection by an optical tactile sensor provided on a bottom surface of each of the elastic bodies.

15. The gripping control device according to claim 1, wherein the circuitry detects the displacement in the normal direction of each of the elastic bodies by a displacement sensor provided on a bottom surface of each of the elastic bodies.

16. The gripping control device according to claim 6, wherein the circuitry detects the displacement in the shear direction by an optical tactile sensor provided on a bottom surface of each of the elastic bodies.

17. The gripping control device according to claim 6, wherein the circuitry detects the displacement in the shear direction by a force sensor provided on a bottom surface of each of the elastic bodies.

18. The gripping control device according to claim 1, wherein the circuitry is configured to determine the inclination of the contact surface by solving a plane equation using a least-squares method based on coordinates of the plurality of elastic bodies and the spatial distribution of the plurality of the displacements.

19. The gripping control device according to claim 1, wherein the determined inclination of the contact surface varies dynamically according to a contact state between each of the plurality of fingertips and the gripped object, and is distinct from a fixed orientation of the coordinate axis of the fingertips.

20. The gripping control device according to claim 1, further comprising:

a memory configured to store a coefficient of friction between each of the plurality of fingertips and the gripped object, wherein the circuitry is configured to calculate a force to be applied by each of the plurality of fingertips such that a tangential force component relative to the calculated contact surface normal does not exceed a friction limit determined by the contact surface normal and the coefficient of friction.

21. A gripping control method comprising:

detecting displacement in a normal direction of each of a plurality of elastic bodies each having a curved surface shape, the plurality of elastic bodies provided for each of a plurality of fingertips of a gripping device that is in contact with a gripped object;

calculating, using circuitry, a contact surface normal of each of the plurality of fingertips to the gripped object by approximating a spatial distribution of the plurality of the displacements in the normal direction to a plane to determine an inclination of a contact surface of each of the plurality of fingertips relative to a coordinate axis of the fingertips, the contact surface normal being calculated based on the determined inclination; and controlling, using the circuitry, the gripping device using the calculated contact surface normal of each of the plurality of fingertips to the gripped object.

* * * * *